US012793997B2

(12) United States Patent
Magagnin et al.

(10) Patent No.: US 12,793,997 B2
(45) Date of Patent: Nov. 10, 2026

(54) RECHARGEABLE FLOW BATTERY

(71) Applicant: Politecnico di Milano, Milan (IT)

(72) Inventors: Luca Magagnin, Rho (IT); Alessandra Accogli, Diso (IT); Matteo Salerno, Saronno (IT); Luca Bertoli, Brescia (IT); Gabriele Panzeri, Cornate d'Adda (IT)

(73) Assignee: Politecnico di Milano, Milan (IT)

( * ) Notice: Subject to any disclaimer, the term of this patent is extended or adjusted under 35 U.S.C. 154(b) by 727 days.

(21) Appl. No.: 18/256,790

(22) PCT Filed: Dec. 10, 2021

(86) PCT No.: PCT/IT2021/050403
§ 371 (c)(1),
(2) Date: Jun. 9, 2023

(87) PCT Pub. No.: WO2022/123614
PCT Pub. Date: Jun. 16, 2022

(65) Prior Publication Data

US 2024/0047714 A1 Feb. 8, 2024

(30) Foreign Application Priority Data

Dec. 10, 2020 (IT) ........................ 102020000030257

(51) Int. Cl.
*H01M 8/18* (2006.01)

(52) U.S. Cl.
CPC .................................. *H01M 8/188* (2013.01)

(58) Field of Classification Search
CPC ...................................................... H01M 8/188
See application file for complete search history.

(56) References Cited

U.S. PATENT DOCUMENTS

| | | | | |
|---|---|---|---|---|
| 2015/0093606 | A1 * | 4/2015 | Chen | H01M 10/4214 429/105 |
| 2019/0131620 | A1 * | 5/2019 | Bartling | H01M 8/188 |
| 2021/0280899 | A1 * | 9/2021 | Yadav | H01M 10/0563 |

FOREIGN PATENT DOCUMENTS

| | | |
|---|---|---|
| CN | 107591591 | 1/2018 |
| CN | 110534784 | 12/2019 |
| WO | 2019241531 | 12/2019 |

OTHER PUBLICATIONS

International Search Report and Written Opinion of PCT/IT2021/050403 dated May 2, 2022, 17 pages.
M.H. Chakrabarti et al: "Application of carbon materials in redox flow batteries", Journal of Power Sources, vol. 253, Jan. 1, 2014 (Jan. 1, 2014), pp. 150-166, XP055114060, ISSN: 0378-7753, DOI: 10.1016/j.ipowsour.2013.12.038 the whole document.

* cited by examiner

*Primary Examiner* — Eugenia Wang
(74) *Attorney, Agent, or Firm* — Rankin, Hill & Clark, LLP

(57) ABSTRACT

The rechargeable flow battery comprises a first half cell and a second half cell, each comprising a work tank wherein an electrode and a current collector are placed, and wherein an electrolyte is made to flow from an external tank, connected to the work tank in a closed loop configuration. The first and second half cells are separated by a separator.

15 Claims, 9 Drawing Sheets

RECHARGEABLE FLOW BATTERY

FIELD OF THE INVENTION

The present invention concerns a rechargeable flow battery. More precisely it concerns an aqueous zinc/permanganates redox flow battery.

Such battery is capable of generating high energy densities, avoiding the use of toxic or environmentally harmful chemicals.

BACKGROUND OF THE INVENTION

Energy requirements have been increasing in recent years and new renewable sources are being gradually adopted to replace traditional fossil fuels. However, because renewable energy sources are heavily dependent on weather conditions, there is a need to integrate them with reliable energy storage systems. A common form of energy storage systems are batteries, which can store energy in the form of chemical energy and release it whenever it is needed in the form of electricity.

For example, the rechargeable flow battery (RFB) is a promising and versatile architecture that can store high amounts of energy and have a long cycle life. An RFB cell consists mainly of two half-cells separated by a membrane (or separator), each containing an electrode (positive and negative electrodes respectively) and an electrolyte. Current collectors are generally in contact with the electrical circuit outside the battery; bipolar plates separate the current collectors from the electrodes. The electrolytes, called anolyte and catholyte, contain the redox-active species dissolved in an aqueous or non-aqueous solvent and flow into the half-cells, in contact with the electrodes, thanks to external pumps.

This structure results in a complete decoupling of the power and energy density of the device because, unlike the traditional architecture of a static battery, the active material is stored outside the cell in two external tanks. In this way, the volume of the tanks ensures that the system can be scaled as needed, determining the overall energy density of the battery; in order to achieve an effective volumetric energy density, it is necessary to consider and optimize the solubility of the active species.

The power output is determined by the active area of the electrodes because only the electrolyte inside the cell undergoes a redox reaction. The most common electrodes are carbon-based materials, such as carbon felt due to its high active surface area and chemical inertness towards most solutions and pH.

Several types of RFB have been studied since the 1970s, the most common being the All-vanadium, Fe—Cr and Zn—Br systems. The decay of capacity and the toxicity of the last two systems, and the high cost of vanadium salts, limit their commercialization worldwide, resulting in an urgent need for improvement of RFB systems.

WO2019241531 describes a RFB of the Zn—$MnO_2$ type which is based on an acidic manganese-based chemistry. The operation of this battery implies a process of electrodeposition of $MnO_2$ which has various disadvantages such as, for example, a low electrical conductivity of the compound, low adhesion and necessity of reconditioning cycles of the battery. Moreover, the high difference of pH between the two semi-cells (between 3 and 13 pH points) might determine a migration of the $H^+$ and $OH^-$ ions through the bipolar membrane, so inducing a minor difference of or the same pH in both semi-cells, determining a diminution of the performance, in terms of cell potential and stability of the electrolyte (e.g. possible precipitation of the salts). Furthermore, the use of acid electrolytes can have an effect on the service lifetime of the pumps and/or of the other components of the battery, requiring particular attention in the selection of the materials and special care in safety.

CN107591591 describes a zinc-air type battery wherein permanganates are not present, these latter being described only within a synthesis process which takes benefit of the high oxidizing activity thereof, but without indicating any electrochemically active role of the permanganates in the functioning of the battery.

The patent CN110534784 describes the preparation of aqueous electrolytes based on permanganates, used as catholyte, for the assembly of a flow battery under alkaline conditions, coupled with a solid anode in the form of a zinc plate.

It is therefore necessary to devise a rechargeable flow battery which can overcome at least one of the drawbacks of the known art.

In particular, a scope of the present invention is that of developing a rechargeable flow battery that avoids the use of toxic or potentially environmentally harmful chemicals such as cyanides.

Another scope of the present invention is that of realizing a rechargeable flow battery able to support a large number of cycles at high energy efficiency.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants of the main inventive idea.

In accordance with the aforesaid objectives and purposes, the present invention concerns a rechargeable flow battery based on safe, low-cost and abundant materials on the planet, capable of providing an energy source characterized by high energy efficiency and great energy density.

The battery has a permanganate-based solution, as catholyte, coupled with a zinc-based solution, as anolyte, in alkaline conditions, taking advantage from the metal electrodeposition of zinc on one side of the cell, thus obtaining a plated metal-permanganates rechargeable flow battery.

In accordance with embodiments of the invention, a rechargeable flow battery (RFB) is provided, which includes:

- a first half-cell comprising a first work tank, a first electrode placed therein, a first electrolyte, a first external tank connected with the first work tank in a closed loop configuration and a first pump to recirculate the first electrolyte between the first work tank and the first external tank; and
- a second half-cell comprising a second work tank, a second electrode placed therein, a second electrolyte, a second external tank connected to the second work tank in a closed loop configuration, and a second pump to recirculate the second electrolyte between the second work tank and the second external tank.

The first electrolyte contains at least a compound source of $Zn(OH)_4^{2-}$ ions, which are suitable to be electrochemically reduced to the metallic state during the charging process, and the second electrolyte contains at least a compound source of $MnO_4^{2-}$ ions, which are suitable to be electrochemically oxidized to $MnO_4^-$ during the charging process. Doing so, electrodeposition reactions occur at the negative electrode only.

The first and second electrodes can be static or flowable.

Advantageously, each half cell also comprises a current collector in the respective work tank, and in electrical contact with the respective electrode.

In a favorable way, the RFB also comprises a separator between the two half cells.

Preferably, the compound source of $Zn(OH)_4^{2-}$ comprises a zinc based salt. Such compound can also comprise electroactive particles containing zinc ions in different oxidation states.

Advantageously, the compound source of $MnO_4^{2-}$ comprises a permanganate based salt. Such compound can also comprise electroactive particles containing permanganate ions in different oxidation states.

The electroactive particles can be of the type of the organic or inorganic particles decorated with zinc- or permanganate-based ions in different oxidation states, metal organic frameworks MOFs containing and/or decorated with zinc- or permanganate-based ions in different oxidation states.

According to embodiments, the first electrolyte and/or the second electrolyte comprises electrically conductive particles. In the first electrolyte, the electrically conductive particles can comprise zinc based particles or carbon based particles. In the second electrolyte, the electrically conductive particles can comprise carbon based particles.

The conductive particles can be part of an electrode, in case this latter is flowable. In alternative, the conductive particles can be part of an electrolyte in case the electrode is static.

ILLUSTRATION OF DESIGNS

These and other features of the present invention will become apparent from the following description of some embodiments provided by way of non-restrictive example, with reference to the accompanying drawings wherein.

To facilitate understanding, the same reference numbers have been used, where possible, to identify identical common elements in the figures. It is understood that elements and characteristics of one embodiment can conveniently be incorporated into other embodiments without further clarifications.

DETAILED DESCRIPTION OF SOME EMBODIMENTS

Figure 1:
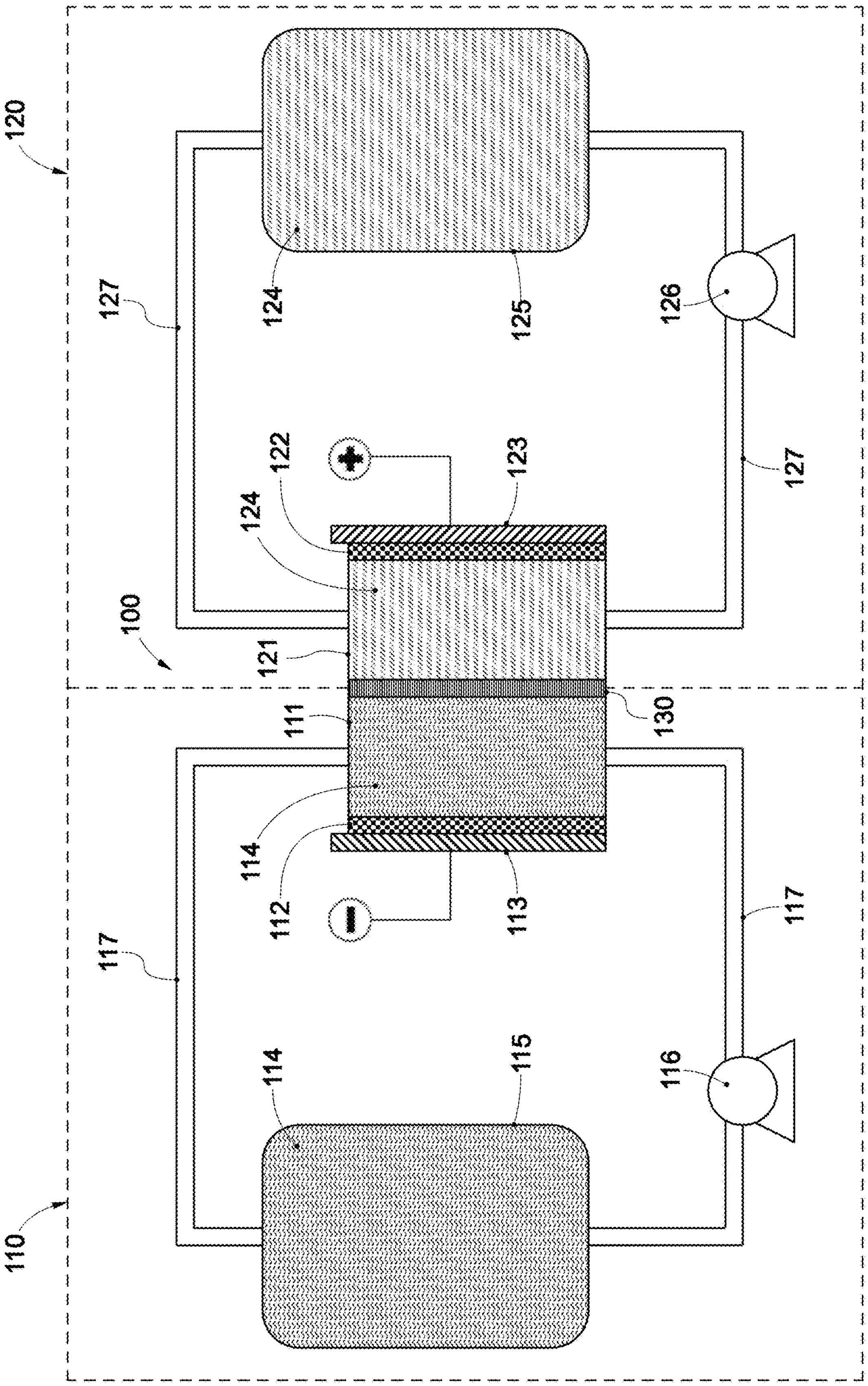
FIG. 1 is a schematic representation of a rechargeable flow battery according to the invention.

It will be now referred in detail to the possible embodiments of the invention, one or more examples of which are illustrated in the attached drawings as examples and not as limitations. Phraseology and terminology used here is also for description purposes and shall not be considered as limiting.

In this invention, a rechargeable flow battery RFB is achieved by coupling an alkaline zinc-based electrolyte with an aqueous permanganates-based electrolyte. This invention not only addresses the problems related to toxicity and the high costs, previously described, of RFB systems present in the state of the art, but also allows to achieve a high efficiency and high energy density: zinc is, in fact, one of the most abundant and economical elements and manganese, another very abundant element on the planet, in the form of permanganate ions shows a high solubility in aqueous electrolytes, thus increasing the energy density.

Unlike other types of chemical systems involving zinc salts, such as zinc-bromides batteries, the RFB chemistry of this invention allows to work in alkaline conditions.

Compared to the battery described in the patent document CN110534784, described above, the battery of this invention is a rechargeable flow battery, where electrolytes flow from a tank outside the electrochemical cell and come into contact with inert electrodes, thus decoupling the power and energy density of the device and allowing the ability to charge and discharge the battery for longer times and with a greater cyclability.

This advantage comes from the elimination of the zinc plate at the negative electrode, now a practice in redox flow cells that use this element. The originality of the proposed invention therefore lies in the chemical optimization of the negative electrolyte with the addition of zinc ions, more or less complexed by any additives or in the form of a complex ion resulting from the starting salts used, which then modify the process of electrodeposition and growth of the metal.

Moreover, within the document of this invention is provided the possibility of using metal elements in optimized quantities in order to form Zn alloys, further reducing its redox potential and thus allowing to achieve a greater open circuit potential and consequently better performances. The strategy used, which then passes from an electrolyte containing zinc ions inside and the consequent electrodeposition on inert electrodes with high surface area, guarantees high energy efficiencies and the complete decoupling of power from energy density, crucial point in this kind of devices.

Rechargeable flow batteries function as energy sources when operating in discharge mode, while operating as energy storage devices when operating in charge mode (charging).

In the RFB of this invention, the two different half-cells reactions during the charging and discharging phase are:

1. Charging Phase:

| | |
|---|---|
| $Zn(OH)_4^{2-} + 2^{e-} \rightarrow Zn^0$ | Negative electrode, cathode, reduction |
| $MnO_4^{2-} \rightarrow MnO_4^- + e^-$ | Positive electrode, anode, oxidation |

2. Discharge Phase:

| | |
|---|---|
| $Zn^0 \rightarrow Zn(OH)_4^{2-} + 2_e^-$ | Negative electrode, anode, oxidation |
| $MnO_4^- + e^- \rightarrow MnO_4^{2-}$ | Positive eletrode, cathode, reduction |

In other words, during the charging phase zinc is electrodeposited on the negative electrode, while the $MnO_4^{2-}$ ion is oxidized to $MnO_4^-$; during the discharge phase, reverse reactions occur, i.e. zinc is oxidized to $Zn(OH)_4^{2-}$ and $MnO_4^-$ is reduced, returning the electrolytes to their initial state. This results in the absence of electrodeposition reactions at the positive electrode, i.e. neither Mn nor $MnO_2$ are formed, with only the previously described ionic redox reactions taking place.

The electrolyte containing the zinc ions, which reacts at the negative electrode, is called anolyte, while the electrolyte containing the permanganate ions, reacting at the positive electrode, is called a catholyte.

FIG. 1 schematically represents the zinc/permanganates RFB of the invention, 100, in its most general configuration. The RFB 100 is composed of the coupling of a first half-cell, 110, to a second half-cell, 120, through a membrane 130.

The first half-cell comprises a first tank 111 and a first electrode 112 placed therein, which can be flow-through (3D) or planar (2D), in electrical contact with a first current collector 113. A first electrolyte 114 is recirculated in a first external tank 115 by means of a first pump 116 and first tubes 117, which connect the first tank 111 and the first external tank 115 in a closed loop configuration. Preferably, a valve system (not shown in the picture) is also provided.

Analogously, the second half-cell comprises a second tank 121 and a second electrode 122 present therein, which can be both flow-through (3D) or planar (2D), in electrical contact with a second current collector 123. A second electrolyte 124 is recirculated in a second external tank 125 by means of a second pump 126 and second tubes 127 that connect the second tank 121 and the second external tank 125 in a closed loop configuration. Preferably, a valve system (not shown in the picture) is also provided.

The following is a description of how an RFB of the invention works in its most general configuration, divided into two separate parts; the first part refers to the charging or recharging phase (i.e. the RFB that acts as an energy accumulator) and the second to the discharge phase (i.e. the RFB that acts as an energy source); this avoids ambiguity in the use of terms such as cathode/anode and similar.

(Re)Charging Operation

In the (re)charge phase, in the first half-cell 110 the cathodic reaction occurs, i.e. the reduction of $Zn(OH)_4^{2-}$ ions to metal zinc, on the surface of electrode 112. The first electrolyte, 114, is stored in an external tank 115, and flows by means of pump 116 through the half-cell 110 while the redox reaction takes place. Once the redox reaction occurs, the first electrolyte is recirculated in the external tank 115 through the outer tube 117, while the new/regenerated electrolyte can enter the electrochemical cell.

Similarly, the second half-cell 120 includes electrode 122 in contact with the second electrolyte 124 and a current collector 123; in this half-cell the anodic reaction, the oxidation of permanganate ions, takes place on the surface of electrode 122. The second electrolyte, 124, is stored in the external tank 125, and flows by means of pump 126 through the half-cell 120 while the redox reaction takes place. Once the redox reaction occurs, the second electrolyte is recirculated in the external tank 125 through the outer tube 127, while the new/regenerated electrolyte can enter the electrochemical cell.

Discharging Operation

In the discharge phase, the zinc/permanganates RFB 100 of the invention operates in the opposite way to the (re) charge phase described above. The RFB components are the same, but in this case in the first half-cell the oxidation reaction of the metal zinc to $Zn(OH)_4^{2-}$ occurs, while in the second half-cell the reduction reaction of the permanganates takes place.

As mentioned above with reference to FIG. 1, a complete RFB of the invention is obtained by the coupling of two different half-cells divided by a membrane. Electrolytes, electrodes, and membranes, as well as other optional elements of the invention, are described separately below.

The Zn-Based Alkaline Electrolyte (the First Electrolyte)

In the description that follows of most of the different embodiments of first and second electrolyte, for clarity the preparation of any electrolyte is described as a sequence of steps (i), (ii), . . . ; while the first step of any preparation, (i), consists in providing a solvent and adding a first compound to produce an ionic conductive solution, the order of the following steps (that is, the order of addition of components to obtain the complete composition of each electrolyte) can be altered and the next components can be added in any sequence, as will be apparent to the skilled person.

In the description that follows and in the accompanying drawings, same elements are identified by the same reference numbers in all embodiments.

The first electrolyte of the invention, or anolyte, contains $Zn(OH)_4^{2-}$ ions and may be prepared by dissolving any suitable source of zinc ions in an aqueous supporting electrolyte containing one or more hydroxides.

In the first and simplest possible embodiment, the anolyte is prepared by dissolving a zinc compound, e.g. zinc oxide (ZnO), zinc hydroxide ($Zn(OH)_2$), acetate ($Zn(CH_3COO)_2$), chloride ($ZnCl_2$), carbonate ($ZnCO_3$) or a combination of two or more thereof in a solvent (generally water, ethylene glycol, methanol, ethanol but also mixtures water-ethylene glycol, water-methanol or other water-based mixtures known in the field).

In a preferred embodiment, this electrolyte is produced by dissolving at least one of the above zinc compounds, preferably zinc oxide, in order to have a concentration of $Zn(OH)_4^{2-}$ ions between 0.001 M and 1.5 M, preferably from 0.01 M to 1.25 M, still more preferably from 0.1 M to 1 M, in an aqueous supporting electrolyte containing one or more compounds including but not limited to sodium hydroxide, potassium hydroxide, lithium hydroxide, ammonium hydroxide, bismuth hydroxide or a combination of two or more thereof. In a preferred embodiment, the overall concentration of hydroxides is between 0.01 M and 20 M, preferably from 0.1 M to 15 M, still more preferably from 1 M to 7 M.

As an example, in one embodiment ZnO is dissolved in an aqueous solution containing NaOH at a concentration ranging from 5 M to 10 M, in such an amount to give rise to a concentration of $Zn(OH)_4^{2-}$ ions of 0.3 M to 1 M.

The first half-cell using this first possible composition of anolyte is represented schematically in FIG. 2, and corresponds to the first half-cell 110 already described with reference to FIG. 1 (in this figure, and in all figures described below representing half-cells, is also shown the presence of the membrane separator); this basic anolyte, containing only the solvent, zinc ions and at least one hydroxide, is electrolyte 114.

In a second embodiment of the invention, the anolyte is obtained by:

(i) dissolving one or more compounds including but not limited to sodium hydroxide, potassium hydroxide, lithium hydroxide, ammonium hydroxide, bismuth hydroxide or a combination of two or more thereof in the solvent (generally water, methanol, ethanol but also mixtures water-ethylene glycol, water-methanol or other water-based mixtures known in the field). In a preferred embodiment, the overall concentration of hydroxides is comprised between 0.01 M and 20 M, preferably from 0.1 M to 15 M, still more preferably from 1 M to 7 M;

(ii) dissolving in the solution of step (i) any suitable source of zinc ions, e.g. zinc oxide (ZnO), zinc hydroxide ($Zn(OH)_2$), zinc acetate ($Zn(CH_3COO)_2$), zinc chloride ($ZnCl_2$), zinc carbonate ($ZnCO_3$) or a combination of two or more thereof. In a preferred embodiment, this electrolyte is produced by dissolving at least one of the above zinc compounds, for example zinc oxide, in order to have a concentration of $Zn(OH)_4^{2-}$ ions between 0.001 M and 1.5 M, preferably from 0.01 M to 1.25 M, still more preferably from 0.1 M to 1 M; and (iii) suspending in the solution of step (ii) conductive particles, preferably zinc-based and/or carbon-based particles, comprising but not limited to zinc particles, zinc oxide particles, zinc coated particles, graphene, expanded graphite, reduced graphene oxide, active carbon, carbon blacks, acetylene black, carbon nanotubes or a combination of two or more thereof.

These particles are introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight of the electrolyte.

Figure 3:
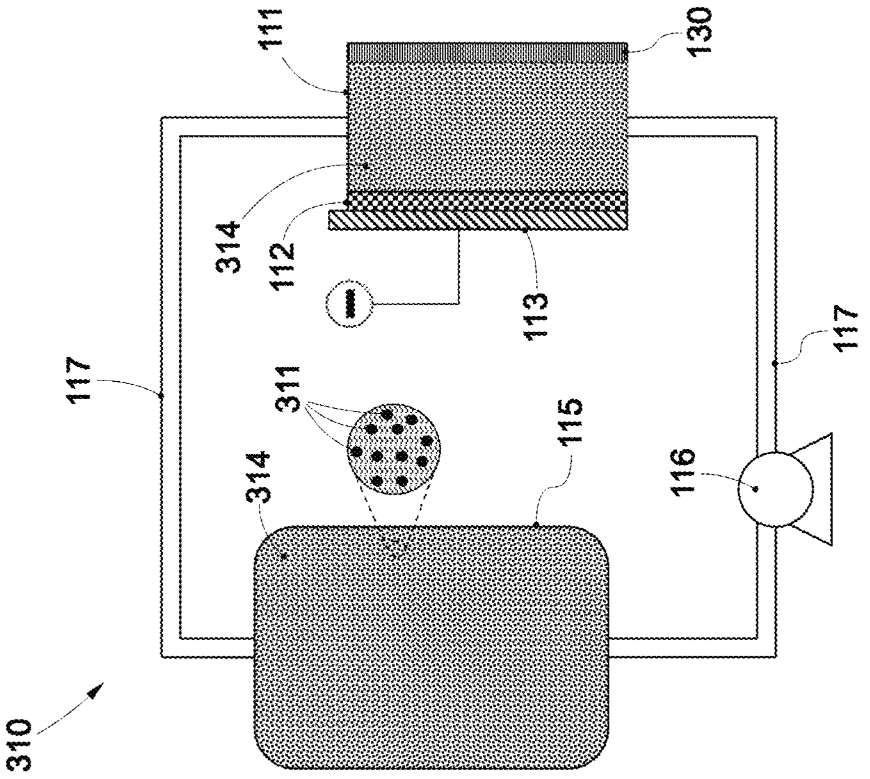
FIGS. 2 to 7 are schematic representations of variants of a first half-cell of the flow battery.

A first half-cell, 310, using the anolyte having this second possible composition is represented schematically in FIG. 3. The anolyte 314 of this embodiment is obtained adding conductive particles 311 to the electrolyte 114 described above; this situation is represented in the inset in FIG. 3. Inside the electrochemical cell the anolyte is in contact with the planar electrode, 112.

In a third possible embodiment of the invention, the anolyte contains electroactive particles containing zinc in the electrolyte. The average size of the particles is in the range from 10 nm to 1000 μm, preferably from 20 nm to 500 μm, more preferably from 20 nm to 200 μm, still more preferably from 20 nm to 10 μm. This electrolyte may be prepared by:

(i) dissolving one or more compounds including but not limited to sodium hydroxide, potassium hydroxide, lithium hydroxide, ammonium hydroxide, bismuth hydroxide or a combination of two or more thereof in the solvent (generally water, methanol, ethanol but also mixtures water-ethylene glycol, water-methanol or other water-based mixtures known in the field). In a preferred embodiment, the overall concentration of hydroxides is comprised between 0.01 M and 20 M, preferably from 0.1 M to 15 M, still more preferably from 1 M to 7 M; and (ii) dissolving in the solution of step (i) a suitable source of zinc ions, e.g. zinc oxide (ZnO), zinc hydroxide ($Zn(OH)_2$), zinc acetate ($Zn(CH_3COO)_2$), zinc chloride ($ZnCl_2$), zinc carbonate ($ZnCO_3$) or a combination of two or more thereof. In a preferred embodiment, this electrolyte is produced by dissolving at least one of the above zinc compounds, for instance zinc oxide, in order to have a concentration of $Zn(OH)_4^{2-}$ ions between 0.001 M and 1.5 M, preferably from 0.01 M to 1 M, still more preferably from 0.1 M to 1 M; and (iii) dissolving or suspending in the solution of step (ii) organic and/or inorganic electroactive particles containing zinc ions in different oxidation states that can be subjected to redox reaction at the surface of the electrode.

The redox reaction can lead to a change in the coordination number of the ion either in the crystalline lattice of the electroactive particle or at the interface between the electroactive particle and the current collector. Electroactive particles, acting as source of Zn ions, can be introduced in an amount in the range from 0.01% by weight to 50% by weight, preferably from 1% by weight to 30% by weight, still more preferably from 5% by weight to 20% by weight.

Figure 4:
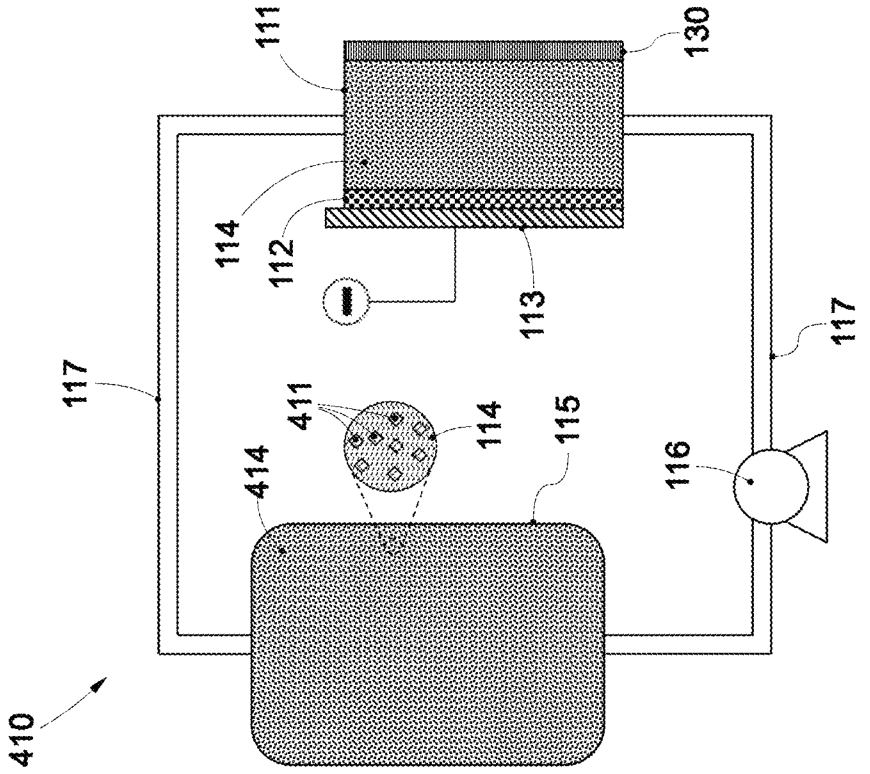

A first half-cell, 410, using the anolyte according to this third possible composition is represented schematically in FIG. 4. The anolyte of this embodiment, 414, is obtained adding electroactive particles 411 to the electrolyte 114 described above; this situation is represented in the inset in FIG. 4. Inside the electrochemical cell the anolyte is in contact with the planar electrode, 112.

In still another (fourth) embodiment of the invention, the anolyte is obtained by dissolving or suspending, in the electrolyte, (i) dispersed electroactive particles containing zinc and (ii) flowable electrodes in form of conductive particles, preferably carbon-based particles, forming a percolated conductive network in/on which redox reaction can occur. The average size of both particles of the dispersion is in the range from 10 nm to 1000 μm, preferably from 20 nm to 500 μm, more preferably from 20 nm to 200 μm, still more preferably from 20 nm to 10 μm. This electrolyte may be prepared by:

(i) dissolving one or more compounds including but not limited to sodium hydroxide, potassium hydroxide, lithium hydroxide, ammonium hydroxide, bismuth hydroxide or a combination of two or more thereof in the solvent (generally water, methanol, ethanol but also mixtures water-ethylene glycol, water-methanol or other water-based mixtures known in the field). In a preferred embodiment, the overall concentration of hydroxides is comprised between 0.01 M and 20 M, preferably from 0.1 M to 15 M, still more preferably from 1 M to 7 M;

(ii) dissolving in the solution of step (i) any suitable source of zinc ions, e.g. zinc oxide (ZnO), zinc hydroxide ($Zn(OH)_2$), zinc acetate ($Zn(CH_3COO)_2$), zinc chloride ($ZnCl_2$), zinc carbonate ($ZnCO_3$) or a combination of two or more thereof. In a preferred embodiment, this electrolyte is produced by dissolving at least one of the above zinc compounds, for instance zinc oxide, in order to have a concentration of $Zn(OH)_4^{2-}$ ions between 0.001 M and 1.5 M, preferably from 0.01 M to 1 M, still more preferably from 0.1 M to 1 M;

(iii) dissolving or suspending in the solution of step (ii) organic and/or inorganic electroactive particles containing zinc ions in different oxidation states that can be subjected to redox reaction. The redox reaction can lead to a change in the coordination number of the ion either in the crystalline lattice of the electroactive particle or at the interface between the electroactive particle and the current collector. Electroactive particles, acting as source of Zn ions, can be introduced in an amount in the range from 0.01% by weight to 50% by weight, preferably from 1% by weight to 30% by weight, still more preferably from 5% by weight to 20% by weight; and (iv) suspending in the solution of step (iii) conductive particles, preferably zinc-based and/or carbon-based particles, comprising but not limited to graphene, expanded graphite, reduced graphene oxide, active carbon, carbon blacks, acetylene black, carbon nanotubes or a combination of two or more thereof. In a preferred embodiment, the overall concentration ranges from 0.01% by weight to 20% by weight, preferably from 0.1% by weight to 10% by weight, still more preferably from 1% by weight to 5% by weight.

Figure 5:
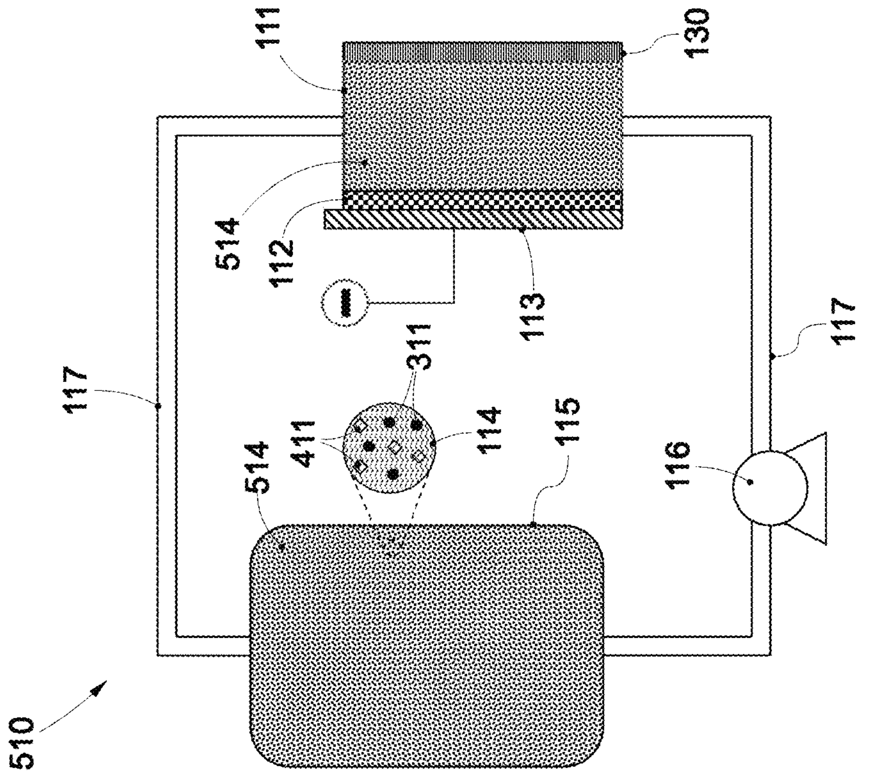

A first half-cell, 510, using the anolyte according to this fourth possible composition is represented schematically in FIG. 5. The anolyte of this embodiment, 514, is obtained adding to the electrolyte 114 described above conductive particles 311, that in this case are only carbon-based particles, and zinc-based electroactive particles 411; this situation is represented in the inset in FIG. 5. Inside the electrochemical cell the anolyte is in contact with the planar electrode, 112.

In a fifth possible embodiment of the invention, the anolyte contains electroactive particles containing zinc in a supporting electrolyte. The average size of the particles is in the range from 10 nm to 1000 μm, preferably from 20 nm to 500 μm, more preferably from 20 nm to 200 μm, still more preferably from 20 nm to 10 μm. This electrolyte may be prepared by:

(i) dissolving one or more compounds including but not limited to sodium hydroxide, potassium hydroxide, lithium hydroxide, ammonium hydroxide, bismuth hydroxide or a combination of two or more thereof in the solvent (generally water, methanol, ethanol but also mixtures water-ethylene glycol, water-methanol or other water-based mixtures known in the field). In a preferred embodiment, the overall concentration of hydroxides is comprised between 0.01 M and 20 M, preferably from 0.1 M to 15 M, still more preferably from 1 M to 7 M; and (ii) dissolving or suspending in the solution of step (i) organic and/or inorganic electroactive particles containing zinc ions in different oxidation states that can be subjected to redox reaction at the surface of the electrode. The redox reaction can lead to a change in the coordination number of the ion either in the crystalline lattice of the electroactive particle or at the interface between the electroactive particle and the current collector. Electroactive particles, acting as source of Zn ions, can be introduced in an amount in the range from 0.01% by weight to 50% by weight, preferably from 1% by weight to 30% by weight, still more preferably from 5% by weight to 20% by weight.

Figure 6:
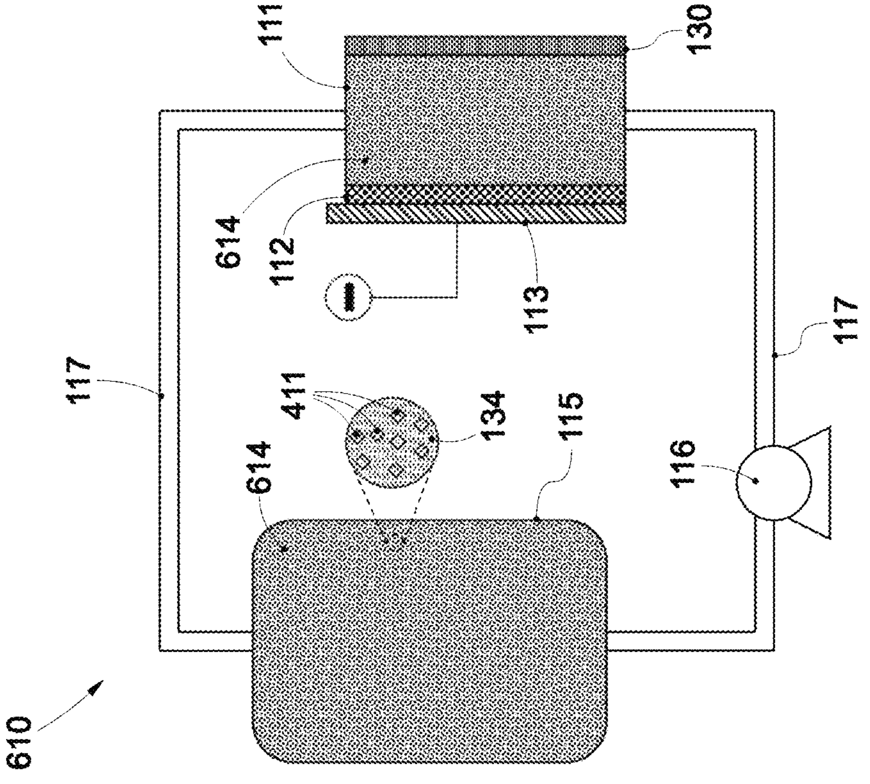

A first half-cell, 610, using the anolyte according to this fifth possible composition is represented schematically in FIG. 6. The liquid phase of this anolyte comprises a solvent and a hydroxide, and differs from electrolyte 114 of the previous embodiments in that it does not contain dissolved zinc salts; this liquid phase acts thus as a supporting electrolyte and is indicated by numeral 134. The anolyte of this embodiment, 614, is obtained adding electroactive particles 411 to the supporting electrolyte 134; this situation is represented in the inset in FIG. 6. Inside the electrochemical cell the anolyte is in contact with the planar electrode, 112.

In still another (sixth) embodiment of the invention, the anolyte is obtained by dissolving or suspending, in a supporting electrolyte, (i) dispersed electroactive particles containing zinc ions and (ii) flowable electrodes in form of conductive particles, preferably carbon-based particles, forming a percolated conductive network in/on which redox reaction can occur. The average size of both particles of the dispersion is in the range from 10 nm to 1000 μm, preferably from 20 nm to 500 μm, more preferably from 20 nm to 200 μm, still more preferably from 20 nm to 10 μm. This electrolyte may be prepared by:

(i) dissolving one or more compounds including but not limited to sodium hydroxide, potassium hydroxide, lithium hydroxide, ammonium hydroxide, bismuth hydroxide or a combination of two or more thereof in the solvent (generally water, methanol, ethanol but also mixtures water-ethylene glycol, water-methanol or other water-based mixtures known in the field). In a preferred embodiment, the overall concentration of hydroxides is comprised between 0.01 M and 20 M, preferably from 0.1 M to 15 M, still more preferably from 1 M to 7 M;

(ii) dissolving or suspending in the solution of step (i) organic and/or inorganic electroactive particles containing zinc ions in different oxidation states that can be subjected to redox reaction. The redox reaction can lead to a change in the coordination number of the ion either in the crystalline lattice of the electroactive particle or at the interface between the electroactive particle and the current collector. Electroactive particles, acting as source of Zn ions, can be introduced in an amount in the range from 0.01% by weight to 50% by weight, preferably from 1% by weight to 30% by weight, still more preferably from 5% by weight to 20% by weight; and (iii) suspending in the solution of step (ii) conductive particles, preferably zinc-based and/or carbon-based particles, comprising but not limited to graphene, expanded graphite, reduced graphene oxide, active carbon, carbon blacks, acetylene black, carbon nanotubes or a combination of two or more thereof. In a preferred embodiment, the overall concentration ranges from 0.01% by weight to 20% by weight, preferably from 0.1% by weight to 10% by weight, still more preferably from 1% by weight to 5% by weight.

Figure 7:
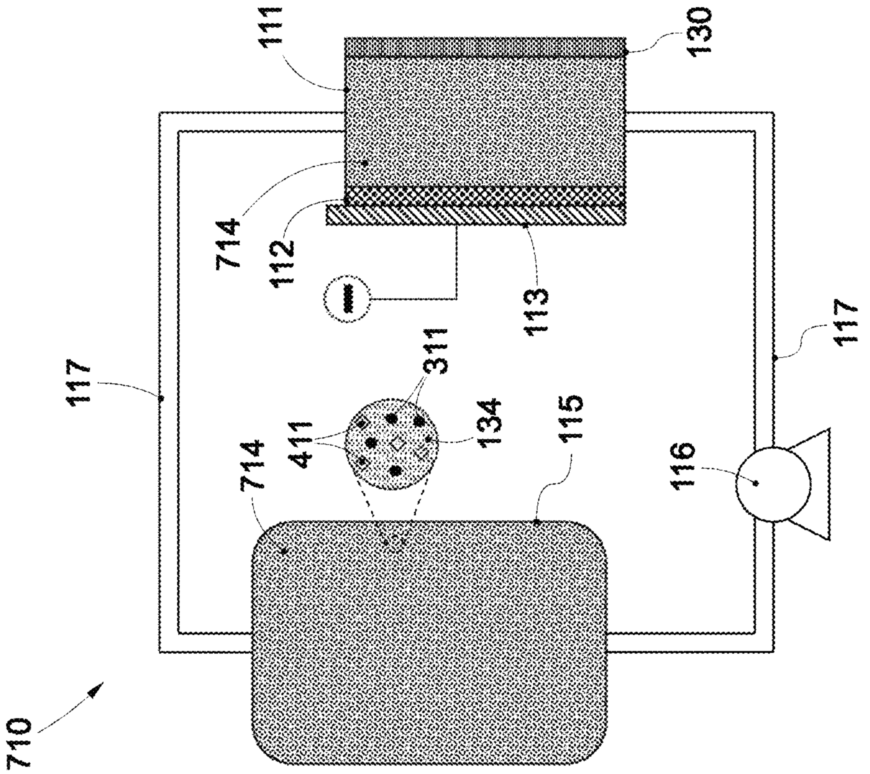

A first half-cell, 710, using the anolyte according to this sixth possible composition is represented schematically in FIG. 7. The anolyte of this embodiment, 714, is obtained adding to the supporting electrolyte 134 described above conductive particles 311, that in this case are only carbon-based particles, and zinc-based electroactive particles 411; this situation is represented in the inset in FIG. 7. Inside the electrochemical cell the anolyte is in contact with the planar electrode, 112.

Any suitable metallic element able to be co-deposited with zinc, forming an alloy, can be added to the anolyte of any one of the embodiments above. In particular, metallic elements, in the form of ions, are obtained from their respective salts, oxides and hydroxides and properly selected in order to (i) shift the zinc electrochemical potential and (ii) to increase the overvoltage of hydrogen evolution. These metallic elements comprise but are not limited to Pb, Mn, Sn, Fe, Ni, Cu, Mg, Ti, Co, Al, Li, Zr or a combination of two or more thereof. In a preferred embodiment they are introduced in a concentration ranging from 0.001 M to 1 M, preferably from 0.01 M to 0.5 M, still more preferably from 0.05 M to 0.3 M.

Besides, any one of the anolytes described above may further contain additives such as hydrogen evolution suppressor(s), Zn complexing agents, leveling agent(s), brightener(s), corrosion protective compounds, and similar additives, for stabilizing the operation of the first half-cell and increasing the battery performances, as detailed below.

A first possible additive of the first electrolyte is a hydrogen evolution suppressor. This component is added in order to increase the battery coulombic efficiency and to reduce side reaction during the charging phase; this additive could be also effective in avoiding pH variation of the electrolyte. The hydrogen evolution suppressor may be selected among silicates, Pb, Bi, Mn, W, Cd, As, Sb, Sn, In and their oxides, boric acid or a combination thereof, in an overall concentration in the range between 0.001 M to 5 M, preferably from 0.01 M to 2 M, still more preferably from 0.05 M to 1 M.

The anolyte may further contain Rochelle salts in a concentration between 0.001 M and 10 M, preferably from 0.1 M to 5 M, preferably from 0.5 M to 2 M; these salt act complexing zinc ions and increasing the conductivity of the electrolyte.

Another possible additive of the anolyte is a leveling agent, reducing the dendritic growth of electrodeposited zinc, which would affect the long-time performances of the battery. Leveling agents include, e.g., polyethylene glycol (PEG), polyethylenimine (PEI), thiourea, quaternary ammonium salts, dextrins, cyclodextrins, sucrose, polytetrafluoroethylene (PTFE), sodium dodecyl sulfate (SDS), polyacrylic acid, glucose and cellulose or combinations thereof, with a concentration between 0.0001 ppm to 10000 ppm, preferably from 0.002 ppm to 5000 ppm, still more preferably from 1 ppm to 1000 ppm. In a preferred embodiment, the Zn-based electrolyte contains PEI from 0.01 ppm to 5000 ppm, preferably from 1 ppm to 2000 ppm, more preferably from 5 ppm to 1000 ppm.

In another embodiment, plasticizer additives may be added to the electrolyte formulation. These additives comprise, but are not limited to, polyols (such as polyethylene glycol (PEG), ethylene glycol, diethylene glycol (DEG), tetraethylene glycol (TEG), propylene glycol (PG), glycerol, mannitol, sorbitol, xylitol), monosaccharides (e.g., glucose, mannose, fructose, sucrose), fatty acids, urea, ethanolamine, triethanolamine, vegetable oils, lecithin, waxes, amino acids, surfactants and oleic acid, in a range between 0.1% by weight and 5% by weight, more preferably between 0.3% by weight and 3% by weight, still more preferably between 0.5% by weight and 1% by weight.

In still another embodiment, the invention relates also the addition of thickener additives suitable to guarantee the best particles dispersion and a suitable electrolyte viscosity in case of dispersed particles. The amount of these organic additives is comprised in a range between 0.0001% to 10% by weight of the electrolyte, preferably from 0.01% by weight to 5% by weight, still more preferably from 0.1% by weight to 1% by weight.

In a preferred embodiment, the zinc-based electrolyte contains organic additives including but not limited to xanthan gum, gum arabic, carboxymethyl cellulose, chitosan, agar-agar, sodium alginate and polyethylene oxide in an amount comprised in a range between 0.0001% to 10% by weight of the electrolyte, preferably from 0.01% by weight to 5% by weight, still more preferably from 0.1% by weight to 1% by weight.

The Aqueous Permanganates-Based Electrolyte (the Second Electrolyte)

The second electrolyte of the invention, or catholyte, contains permanganate ions according to different embodiments, which are described in detail below.

A first variant of second electrolyte, or catholyte, of the invention may be prepared by:

(i) dissolving one or more compounds including but not limited to sodium hydroxide, potassium hydroxide, lithium hydroxide, ammonium hydroxide, bismuth hydroxide or a combination of two or more of them in a solvent (usually water, methanol, ethanol, but also water-ethylene glycol mixtures, water-methane or other water-based mixtures). In a preferred embodiment, the overall concentration of hydroxide is between 0.01 M and 20 M, preferably from 0.1 M to 15 M, still more preferably from 1 M to 7 M;

(ii) dissolving in the solution obtained in phase i) any suitable source of permanganates including but not limited to the lithium permanganate ($LiMnO_4$), the sodium permanganate ($NaMnO_4$), the potassium permanganate ($KMnO_4$) or a combination of two or more of them in the solvent.

In a preferred embodiment, this first catholyte of the invention is obtained by dissolving in the supporting electrolyte permanganate-based salts, in order to have an overall concentration of $MnO_4^-$ ions between 0.01 M and 20 M, preferably from 0.1 M to 15 M, still more preferably from 1 M to 10 M.

In another still preferred embodiment of the invention, the $NaMnO_4$ is dissolved in a concentration from 1 M to 4 M in an aqueous solution containing NaOH, which concentration ranges from 1 M to 10 M.

In another still preferred embodiment of the invention, the $KMnO_4$ is dissolved in a concentration of 1 M to 4 M in an aqueous solution containing KOH in a concentration ranging from 1 M to 10 M.

Figure 8:
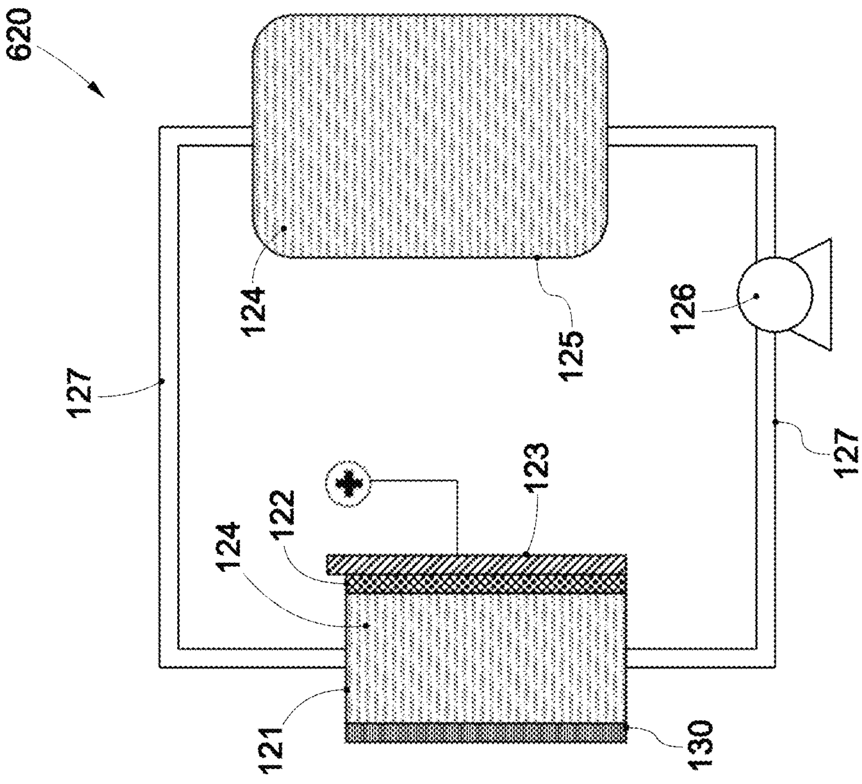

A second half-cell, 620, which uses catholyte according to this early possible composition is represented schematically in FIG. 8. The catholyte of this embodiment, 124, contains the solvent, at least one hydroxide, and the permanganate ions.

A second possible embodiment of catholyte the invention is obtained by introducing, in the electrolyte, conductive particles, preferably carbon-based particles, forming a percolated conductive network in/on which redox reaction can occur. The average size of the particles of the dispersion is in the range from 10 nm to 1000 μm, preferably from 20 nm to 500 μm, more preferably from 20 nm to 200 μm, still more preferably from 20 nm to 10 μm.

This electrolyte can be prepared:

(i) dissolving one or more compounds including but not limited to sodium hydroxide, potassium hydroxide, lithium hydroxide, ammonium hydroxide, bismuth hydroxide or a combination of two or more of them in the solvent (usually water, methanol, ethanol, but also water-ethylene glycol mixtures, water-methanol or other water-based mixtures). In a preferred embodiment, the overall concentration of hydroxides is between 0.01 M and 20 M, preferably from 0.1 M to 15 M, still more preferably from 1 M to 7 M;

(ii) dissolving in the solution obtained in the stage (i) permanganate salts for a total concentration of $MnO_4^-$ ions between 0.01 M and 20 M, preferably from 0.1 M to 15 M, still more preferably from 1 M to 10 M; and iii) suspending in the solution obtained in phase ii) conductive particles, preferably carbon-based particles, including but not only graphene, expanded graphite, graphene oxide, active carbon, carbon black, acetylene black, carbon nanotubes or a combination of two or more of them, to form a conductive percolation network within the electrolyte. In a preferred embodiment, the overall concentration ranges from 0.01% by weight to 20% by weight, preferably from 0.1% by weight to 10% by weight, still more preferably from 1% by weight to 5% by weight with respect to the total weight of the catholyte.

Figure 9:
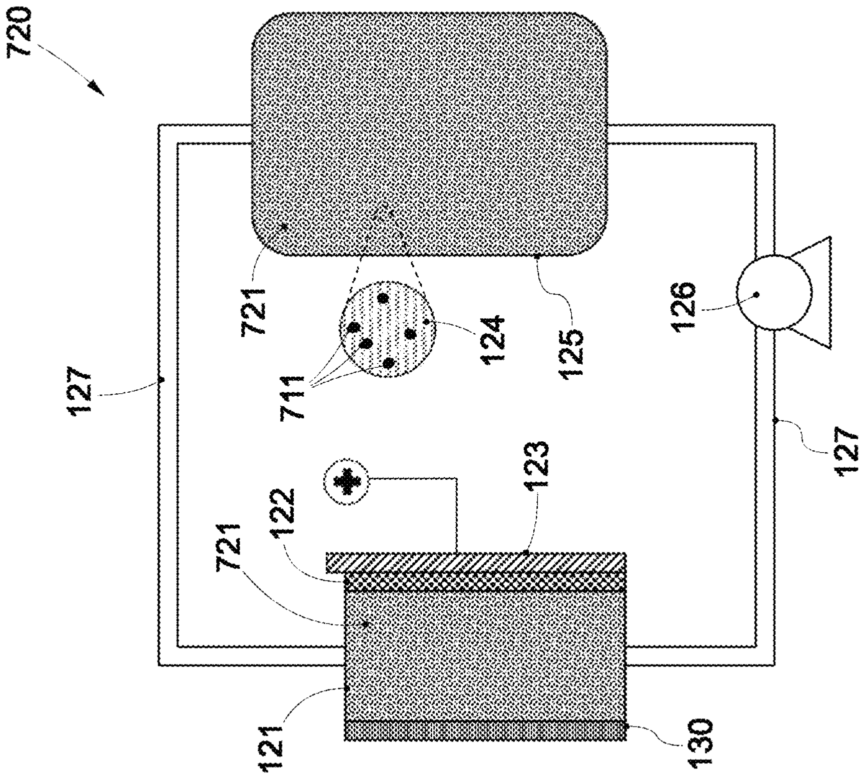
FIGS. 8 to 13 are schematic representations of variants of a second half-cell of the flow battery.

A second half-cell, 720, using the catholyte according to this second possible composition is represented schematically in FIG. 9. The catholyte of this embodiment, 721, is obtained by adding conductive particles 711 (the types of particles are represented in the insert of the figure) to the electrolyte 124.

A third possible embodiment of the invention is a catholyte that includes electroactive particles containing permanganate ions, dispersed in a supporting electrolyte and reacting through redox reactions. The average size of the electroactive particles is in the range of 10 nm to 1000 μm, preferably from 20 nm to 500 μm, preferably from 20 nm to 200 μm, still more preferably from 20 nm to 10 μm. This electrolyte can be prepared:

(i) dissolving one or more compounds including but not limited to sodium hydroxide, potassium hydroxide, lithium hydroxide, ammonium hydroxide, bismuth hydroxide or a combination of two or more of them in the solvent (generally water, methanol, ethanol but also mixtures water-ethylene glycol, water-methanol or other water-based mixtures known in the field). In a preferred embodiment, the overall concentration of hydroxides is between 0.01 M and 20 M, preferably from 0.1 M to 15 M, still more preferably from 1 M to 7 M; and (ii) dissolving or suspending organic and/or inorganic permanganate-base electroactive particles, containing permanganate ions in different oxidation states that can be subjected to redox reaction. The redox reaction can lead to a change in the coordination number of the ion either in the crystalline lattice of the electroactive particle or at the interface between the electroactive particle and the current collector. Electroactive particles, which act as a source of permanganate ions, can be introduced in between 0.01% by weight and 50% by weight, preferably from 1% by weight to 30% by weight, still more preferably from 5% by weight to 20% by weight.

Figure 10:
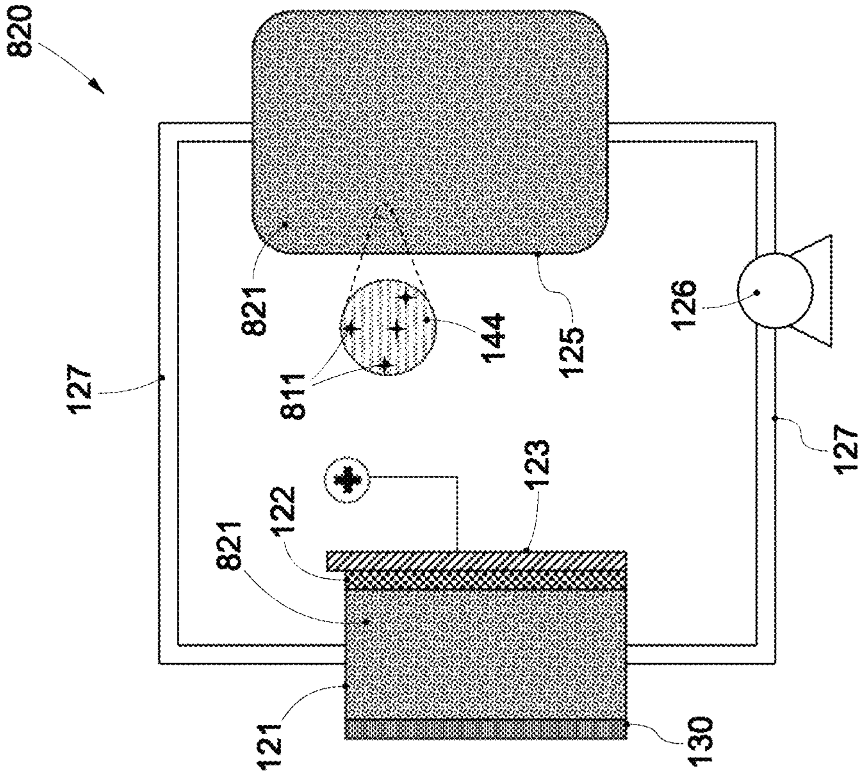

A second half-cell, 820, which uses the catholyte according to this third possible composition is represented schematically in FIG. 10. The liquid phase of this catholyte includes a solvent and a hydroxide, and differs from electrolyte 124 of the previous embodiments in that it does not contain dissolved permanganate salts; this liquid phase then acts as a supporting electrolyte and is indicated by the number 144. The catholyte 821 of this embodiment comprises the supporting electrolyte 144 added with electroactive particles 711 containing permanganate ions. In this embodiment of the invention, electrode 122 can be a static electrode or it may be in the form of a flowable electrode.

In the fourth embodiment of the catholyte of the invention, this includes (i) electroactive particles containing permanganate ions dispersed in a supporting electrolyte and (ii) flowable electrodes in the form of conductive particles, preferably carbon-based, which form a percolated conductive network in/on which the redox reaction can occur. The average size of all dispersed particles is in the range of 10 nm to 1000 μm, preferably from 20 nm to 500 μm, plus preferably from 20 nm to 200 μm, still more preferably from 20 nm to 10 μm.

This electrolyte can be prepared:

(i) dissolving one or more compounds including but not limited to sodium hydroxide, potassium hydroxide, lithium hydroxide, ammonium hydroxide, bismuth hydroid or a combination of two or more of them in the solvent (generally water, methanol, ethanol, but also ethic water-ethylene glycol mixtures, water-methane or other water-based mixtures). In a preferred embodiment, the overall concentration of hydroxides is between 0.01 M and 20 M, preferably from 0.1 M to 15 M, still more preferably from 1 M to 7 M;

(ii) dissolving or suspending organic and/or inorganic permanganate-base electroactive particles, containing permanganate ions in different oxidation states that can be subjected to redox reaction. The redox reaction can lead to a change in the coordination number of the ion either in the crystalline lattice of the electroactive particle or at the interface between the electroactive particle and the current collector. Electroactive particles, which act as a source of permanganate ions, can be introduced in between 0.01% by weight and 50% by weight, preferably from 1% by weight to 30% by weight, still more preferably from 5% by weight to 20% by weight; and iii) suspending in the solution obtained in step ii) conductive particles, preferably carbon-based including but not limited to graphene, expanded graphite, graphene oxide, activated charcoal, carbon black, black acetylene, carbon nanotubes or a combination of two or more of them introduced to form a conductive percolation network within the electrolyte. In a preferred embodiment, the overall concentration ranges from 0.01% by weight to 20% by weight, preferably from 0.1% by weight to 10% by weight, still more preferably from 1% by weight to 5% by weight.

Figure 11:
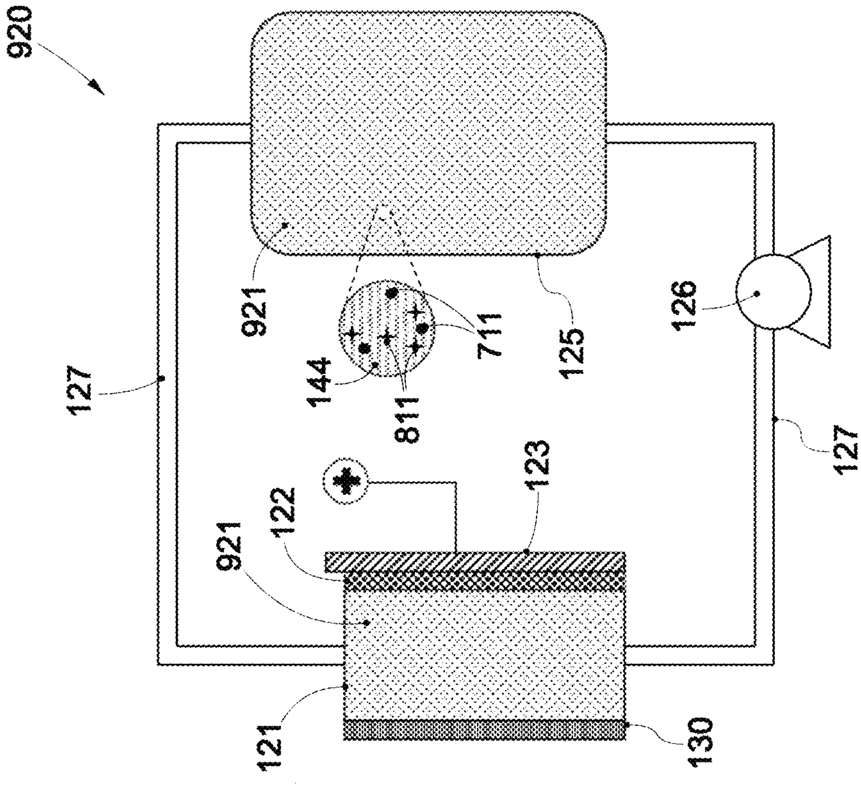

A second half-cell, 920, using the catholyte according to this fourth possible composition is represented schematically in FIG. 11. The catholyte of this embodiment 921, is composed by the supporting electrolyte 144, added with electroactive particles 811 containing permanganate ions and conductive particles 711, which in this case form the flowable electrode in contact with a 2D electrode 122.

A fifth possible embodiment of the invention is a catholyte that includes electroactive particles containing permanganate ions dispersed in the catholyte and that react by means of redox reactions. The average size of the electroactive particles is in the range of 10 nm to 1000 μm, preferably from 20 nm to 500 μm, preferably from 20 nm to 200 μm, still more preferably from 20 nm to 10 μm. This electrolyte can be prepared:

(i) dissolving one or more compounds including but not limited to sodium hydroxide, potassium hydroxide, lithium hydroxide, ammonium hydroxide, bismuth hydroxide or a combination of two or more of them in the solvent (generally water, methanol, ethanol but also mixtures water-ethylene glycol, water-methanol or other water-based mixtures known in the field). In a preferred embodiment, the overall concentration of hydroxides is between 0.01 M and 20 M, preferably from 0.1 M to 15 M, still more preferably from 1 M to 7 M; and (ii) dissolving in the solution obtained in phase i) permanganate salts for an overall concentration of $MnO_4^-$ ions between 0.01 M and 20 M, preferably from 0.1 M to 15 M, still more preferably from 1 M to 10 M;

(iii) dissolving or suspending organic and/or inorganic permanganate-based electroactive particles, containing permanganate ions in several oxidation states that can be subjected to redox reactions. The redox reaction can lead to a change in the coordination number of the ion either in the crystalline lattice of the electroactive particle or at the interface between the electroactive particle and the current collector. Electroactive particles, which act as a source of permanganate ions, can be introduced in between 0.01% by weight and 50% by weight, preferably from 1% by weight to 30% by weight, still more preferably from 5% by weight to 20% by weight.

Figure 12:
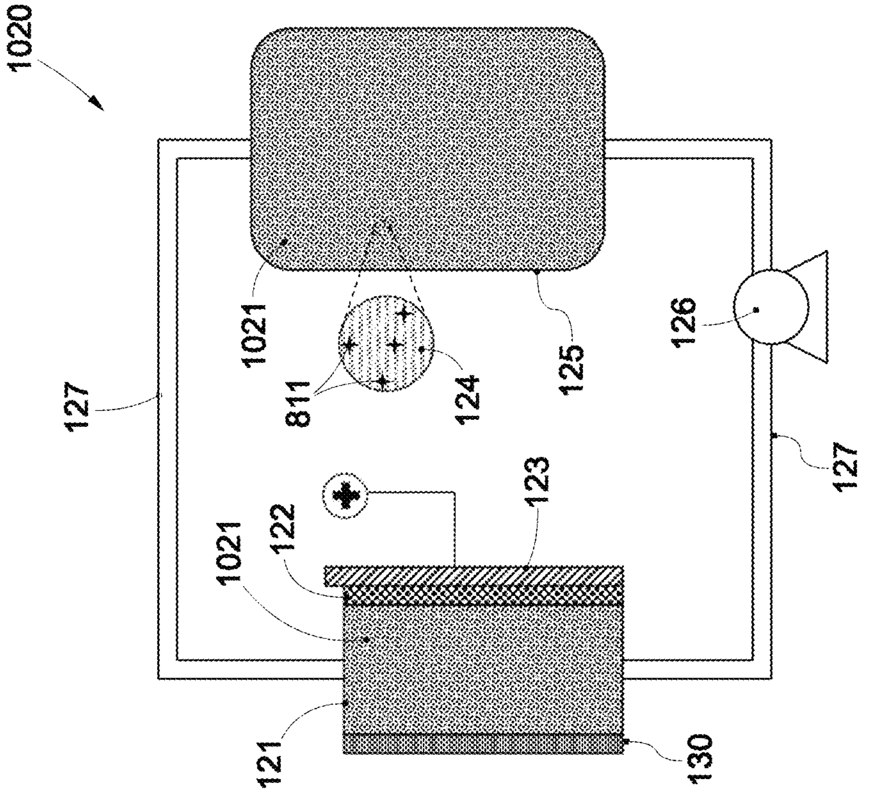

A second half-cell, 1020, using the catholyte according to this fifth possible composition is represented schematically in FIG. 12. The catholyte of this embodiment, 1021, is obtained by adding the electroactive particles containing permanganate ions 811 to the electrolyte 124.

In a sixth embodiment of the catholyte of the invention, this includes (i) electroactive particles containing permanganate ions dispersed in the catholyte and (ii) flowable electrodes in the form of conductive particles, preferably carbon-based, which form a percolated conductive network in/on which the redox reaction can occur. The average size of all dispersed particles is in the range of 10 nm to 1000 μm, preferably from 20 nm to 500 μm, preferably from 20 nm to 200 μm, still more preferably from 20 nm to 10 μm.

This electrolyte can be prepared:

(i) dissolving one or more compounds including but not limited to sodium hydroxide, potassium hydroxide, lithium hydroxide, ammonium hydroxide, bismuth hydroxide or a combination of two or more of them in the solvent (generally water, methanol, ethanol but also mixtures water-ethylene glycol, water-methanol or other water-based mixtures known in the field). In a preferred embodiment, the overall concentration of hydroxide is between 0.01 M and 20 M, preferably from 0.1 M to 15 M, still more preferably from 1 M to 7 M;

(ii) dissolving in the solution obtained in the stage (i) permanganate salts for an overall concentration of $MnO_4^-$ ions between 0.01 M and 20 M, preferably from 0.1 M to 15 M, still more preferably from 1 M to 10 M; and (iii) dissolving or suspending in the solution obtained in the stage (ii) organic and/or inorganic permanganate-based electroactive particles, containing permanganate ions in several oxidation states that can be subjected to redox reactions. The redox reaction can lead to a change in the coordination number of the ion either in the crystalline lattice of the electroactive particle or at the interface between the electroactive particle and the current collector. Electroactive particles, which act as a source of permanganate ions, can be introduced in between 0.01% by weight and 50% by weight, preferably from 1% by weight to 30% by weight, still more preferably from 5% by weight to 20% by weight; and (iv) suspending conductive particles, preferably carbon-based, in the solution obtained in phase (iii), which include, but not limited to, graphene, expanded graphite, graphene oxide, activated charcoal, carbon black, acetylene black, carbon nanotubes or a combination of two or more of them introduced to form a conductive percolation network within the electrolyte. In a preferred embodiment, the overall concentration ranges from 0.01% by weight to 20% by weight, preferably from 0.1% by weight to 10% by weight, still more preferably from 1% by weight to 5% by weight.

Figure 13:
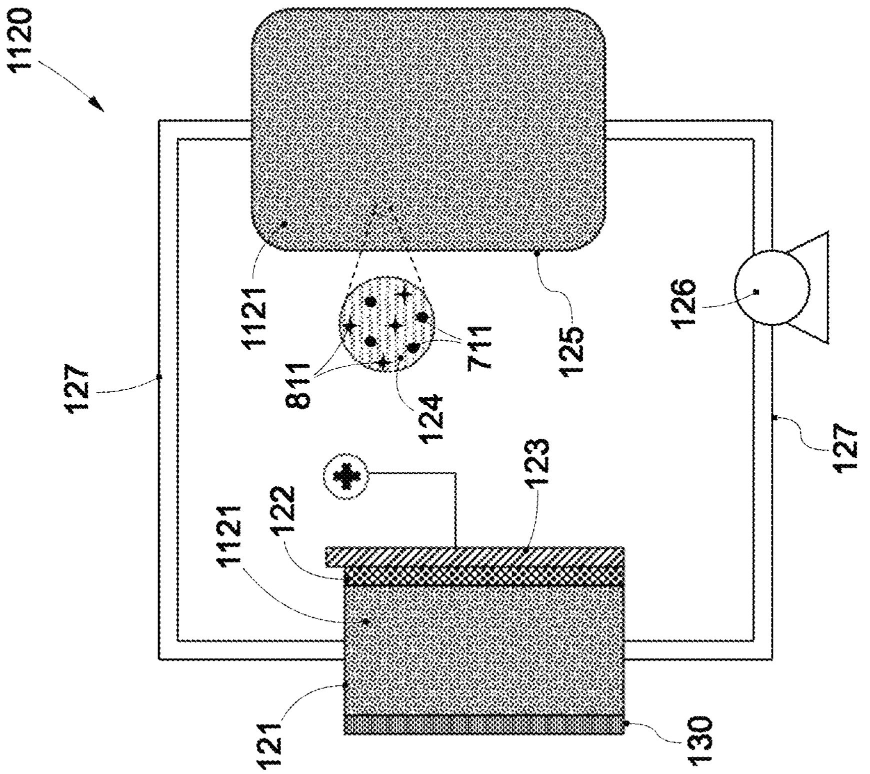

A second half-cell 1120, using the catholyte according to this sixth possible composition is represented schematically in FIG. 13. The catholyte of this embodiment, 1121, consists of electrolyte 124 added with electroactive particles 811 containing permanganate ions, and conductive particles 711, which in this case form the flowable electrode in contact with a 2D electrode 122.

Any suitable metallic element can be added to the catholyte of any one of the embodiments above. In particular, metallic elements, in the form of ions, are obtained from their respective salts, oxides and hydroxides and properly selected in order to (i) increase the electrolyte conductivity, (ii) shift the permanganates redox potential and (iii) pass through the ion-selective membrane. These metallic elements comprise but are not limited to Pb, Sn, Fe, Ni, Cu, Mg, Zn, Ti, Rb, Cs, Ca, K, Sr, Co, Al, Li, Zr or a combination of two or more thereof. In a preferred embodiment they are introduced in a concentration ranging from 0.001 M to 1 M, preferably from 0.01 M to 0.5 M, still more preferably from 0.05 M to 0.3 M.

Any one of the catholytes described above may further contain plasticizers and/or thickeners as additives for stabilizing the operation of the second half-cell and increasing the battery performances.

Plasticizer additives that can be added comprise, but are not limited to, polyols (such as polyethylene glycol (PEG), ethylene glycol, diethylene glycol (DEG), tetraethylene glycol (TEG), propylene glycol (PG), glycerol, mannitol, sorbitol, xylitol), monosaccharides (e.g., glucose, mannose, fructose, sucrose), fatty acids, urea, ethanolamine, triethanolamine, vegetable oils, lecithin, waxes, amino acids, surfactants and oleic acid, in a range between 0.1% by weight and 5% by weight, more preferably between 0.3% by weight and 3% by weight, still more preferably between 0.5% by weight and 1% by weight with respect to the total weight of the catholyte.

Thickener additives allow a better particles dispersion and a suitable electrolyte viscosity in case of dispersed particles. The amount of these organic additives is comprised in a range between 0.0001% to 10% by weight of the electrolyte, preferably from 0.1% by weight to 5% by weight, still more preferably from 0.1% by weight to 1% by weight. In a preferred embodiment, the catholyte contains organic additives including but not limited to xanthan gum, gum arabic, carboxymethyl cellulose, chitosan, agar-agar, sodium alginate and polyethylene oxide.

The Electrodes

The electrodes used in the Zn/permanganate RFB of the invention can be selected from any kind of electrode material.

The electrodes may be made of carbon-based, or they may be in the form of dispersed electrodes. Herein, the former electrode is indicated as static electrode and can be a flow-through 3D one like carbon felt or a planar 2D one like a graphite plate. In the latter case it is indicated as flowable electrode.

Carbon-based static electrodes may be e.g., of graphite sheets, carbon felt, or carbon-based fabric; alternatively, carbon-based flowable electrodes are formed of carbon-based conductive particles dispersed in a polymer matrix. Carbon-based electrodes are suitable for both the first and the second half-cells.

Flowable dispersed electrodes, in the form of a percolated network of dispersed conductive particles, may consist in organic or inorganic conductive particles, functionalized particles or a fluidized bed electrode in the form of particles. These electrodes can be dispersed in both electrolytes; they are particles in/on which redox reactions can occur. Examples of these dispersed electrodes are metallic particles, expanded graphite, graphite, graphene, graphene oxide, reduced graphene oxide, active carbon, transition metal oxide particles, carbon-based, materials decorated with metal oxide particles, carbon nanotubes, carbon black particles, acetylene black particles, metal-coated particles or a combination of two or more thereof. The average size of these particles is in the range from 10 nm to 1000 μm, preferably from 20 nm to 500 μm, more preferably from 20 nm to 200 μm, still more preferably from 20 nm to 10 μm.

In a preferred embodiment, the flowable electrodes in the Zn-based electrolyte may contain Zn particles, Zn oxide particles, Zn coated particles and/or carbon-based particles, comprising but not limited to graphene, expanded graphite, reduced graphene oxide, active carbon, carbon blacks, acetylene black, carbon nanotubes or a combination of two or more thereof are then introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight.

In a preferred embodiment, the flowable electrode in the second half-cell may contain conductive particles, preferably carbon-based particles, comprising but not limited to graphene, expanded graphite, reduced graphene oxide, active carbon, carbon blacks, acetylene black, carbon nanotubes or a combination of two or more thereof are then introduced to form a conductive percolation path inside the electrolyte. In a preferred embodiment, the overall concentration ranges from 0.01% by weight to 20% by weight, preferably from 0.1% by weight to 10% by weight, still more preferably from 1% by weight to 5% by weight.

Using flowable dispersed electrodes provide a high surface area to minimize the over potential for zinc plating/dissolution and a higher cycle life (compared to plating on a flat electrode); in case of flowable dispersed electrodes in the permanganate half-cell, the addition of flowable electrodes can induce a higher battery capacity and a better behavior at high operative rates.

The Membrane Separator

The two half-cells are in contact through a membrane separator. The separator can be chosen as desired for a particular purpose or intended use. In one embodiment, the separator is a porous separator without any active ion-exchange material. Celgard® separators or similar can be used.

In a further embodiment, solid state ceramic separators (e.g. $Al_2O_3$-based one or similar) or glass-ceramic separators can be also used. In one embodiment Na-ion or Li-ion glasses, are used in order to guarantee a cationic exchange of $Na^+$ or $Li^+$ ions between the two half-cells. In another embodiment, the membrane is an ion-selective porous membrane, where ions comprising but not limited to $H^+$, $Na^+$, $K^+$, $Li^+$, $Zn^{2+}$, $Zn(OH)_4^{2-}$, $Mg^{2+}$, $Cu^{2+}$, $Mn^{2+}$, $Fe^{2+}$, $Ti^{2+}$, $Al^{3+}$ pass through.

The separator can be chosen among all suitable materials acting as ionic membrane, depending on purpose. In a first possible embodiment, the membrane is a cationic membrane suitable for batteries where anolyte and catholyte have a different pH, to reduce as much as possible electrolytes cross mixing. In some battery configurations a Nafion™ (co-polymer of perfluorosulfonic acid and polytetrafluoroethylene) membrane is employed.

In another embodiment of the invention, the separator can be chosen between sulfonated polysulfone (SPSF), sulfonated polyetherketone (SPEEK), sulfonated polystyrene (PSS), sulfonated polyimide (SPI) or any other sulfonated aromatic polymers and their combinations. Such membranes might be modified introducing organic or inorganic particles, able to reduce the cross mixing effect between the two electrolytes and improving ionic conductivity, mechanical properties and chemical stability.

In another embodiment of the invention, ionic particles (cationic or anionic depending on purpose) can be dispersed together with conductive particles, preferably carbon-based particles, in a solid/semi-solid polymeric electrolyte, comprising but not limited to co-polymer of perfluorosulfonic acid and polytetrafluoroethylene, poly-vinyl alcohol (PVA), chitosan, poly-acrylic acid (PAA), gelatin, etc. and applied on any of the previously introduced ionic membranes, thus obtaining a multilayer separator. The role of the ionic particles is to block the active ions of the two electrolytes, reducing the cross mixing effect.

In a preferred embodiment, in case of any ion-exchange materials, in all configuration (i.e. mono- or multi-layer(s)), the membrane is swelled in 1 M NaOH or 1 M KOH solution, prior the utilization, in order to guarantee a proper efficient ion exchange between the anolyte and the catholyte during the electrochemical reaction. Swelling time is selected depending on the type of membrane. Alternative membranes, including all known solid/semi-solid organic-inorganic composite electrolytes are also contemplated.

An RFB can be obtained, according to the present invention, by combining any first half-cell with any second half-cell, and using any membrane separator described above.

A Zn/permanganate redox flow battery according to this invention can generally have a cell potential from about 1.8 V to 2.2 V, depending on the amount of hydroxides, permanganates and zinc ions. The Zn/permanganate RFB is generally environmentally friendly, non-toxic and safer if compared to other flow batteries. With respect to the commercially available RFB s, the electrochemical device of the present invention allows to work at higher pH values increasing the battery lifetime.

Moreover, the Zn/permanganate redox flow battery of the invention is significantly cheaper than known RFBs: the cost of this battery can be less than 200 USD/kWh for battery components and less than 90 USD/kWh for electrolyte and tanks, providing energy efficiency as high as 65-85%.

The RFB cell of the present invention can be also electrically coupled in a so-called stacked configuration, connected either in series to obtain higher voltage values, or in parallel to obtain higher current outputs.

The invention will be further illustrated by the examples that follow.

EXAMPLES

Example 1

Preparation of a Zinc-Based Electrolyte for the RFB Half-Cell

A solution has been prepared dissolving sodium hydroxide, NaOH, in Millipore water at room temperature with a concentration of 6 M, followed by 0.1 M of zinc oxide, ZnO. Bismuth oxide, Bi2O3, has been added to increase the conductivity of the final solution. The final formulation is shown in Table 1. The as-prepared solution can work from 25° C. to 70° C.

TABLE 1 example of Zn based electrolyte

| Chemical compound | Chemical formula | Molar mass [g/mol] | Concentration [g/L] | Concentration [mol/l] |
|---|---|---|---|---|
| Sodium hydroxide | NaOH | 40.00 | 240.00 | 6.00 |

TABLE 1-continued

| example of Zn based electrolyte | | | | |
|---|---|---|---|---|
| Chemical compound | Chemical formula | Molar mass [g/mol] | Concentration [g/L] | Concentration [mol/l] |
| Zinc oxide | ZnO | 81.38 | 8.14 | 0.10 |
| Bismuth oxide | $Bi_2O_3$ | 465.90 | 2.33 | 0.005 |

Example 2

Preparation of a Zinc-Based Electrolyte for the RFB Half-Cell

A solution has been prepared dissolving potassium hydroxide, KOH, in Millipore water at room temperature with a concentration of 6 M, followed by 0.1 M of zinc acetate, ($Zn(CH_3COO)_2$), lithium hydroxide, LiOH, has been added to increase the conductivity of the final solution. The final formulation is shown in Table 2. The as-prepared solution can work from 25° C. to 70° C.

TABLE 2

| example of Zn based electrolyte | | | | |
|---|---|---|---|---|
| Chemical compound | Chemical formula | Molar mass [g/mol] | Concen-tration [g/L] | Concen-tration [mol/l] |
| Potassium hydroxide | KOH | 56.11 | 336.66 | 6.00 |
| Zinc acetate | $Zn(CH_3COOH)_2$•$2H_2O$ | 219.50 | 21.95 | 0.10 |
| Lithium oxide | LiOH | 23.95 | 2.39 | 0.10 |

Example 3

Preparation of a Zinc-Based Electrolyte for the RFB Half-Cell

A solution has been prepared dissolving potassium hydroxide, KOH, in Millipore water at room temperature with a concentration of 6 M, followed by 0.1 M of zinc acetate, ($Zn(CH_3COO)_2$), 3% by weight of carbon black particles with an average diameter in the range from 500 and 700 nm, has been added as flowable electrodes. The final formulation is shown in Table 3. The as-prepared solution can work from 25° C. to 70° C.

TABLE 3

| example of Zn based electrolyte | | | | |
|---|---|---|---|---|
| Chemical compound | Chemical formula | Molar mass [g/mol] | Concen-tration [g/L] | Concen-tration [mol/l] |
| Potassium hydroxide | KOH | 56.11 | 336.66 | 6.00 |
| Zinc acetate | $Zn(CH_3COO)_2$•$2H_2O$ | 219.50 | 21.95 | 0.10 |
| Carbon Black | C | 12.01 | 8.52 | 0.71 |

Example 4

Preparation of a Zinc-Based Electrolyte for the RFB Half-Cell

A solution has been prepared dissolving sodium hydroxide, NaOH, and potassium hydroxide, KOH, in Millipore water at room temperature with an overall concentration of 7 M, followed by 0.3 M of zinc acetate, ($Zn(CH_3COO)_2$). Lithium hydroxide, LiOH, has been added to increase the conductivity of the final solution. The final formulation is shown in Table 4. The as-prepared solution can work from 25° C. to 70° C.

TABLE 4

| example of Zn based electrolyte | | | | |
|---|---|---|---|---|
| Chemical compound | Chemical formula | Molar mass [g/mol] | Concen-tration [g/L] | Concen-tration [mol/l] |
| Sodium hydroxide | NaOH | 40.00 | 80.00 | 2.00 |
| Potassium hydroxide | KOH | 56.11 | 280.55 | 5.00 |
| Zinc acetate | $Zn(CH_3COO)_2$•$2H_2O$ | 219.50 | 65.85 | 0.30 |
| Lithium hydroxide | LiOH | 23.95 | 2.39 | 0.10 |

Example 5

Preparation of a Zinc-Based Electrolyte With Dispersed Electrodes

In order to increase battery capacity, power and energy density dispersed electrodes were added to a 6 M KOH supporting electrolyte. In order to properly disperse functionalized particles, acting as electrodes in the half-cell, the electrolyte formulation has been slightly modified. As an example, 1% by weight of xanthan gum has been added as a thickener additive in order to increase the electrolyte viscosity. 2% by weight of zinc oxide particles and 15% by weight of zinc particles are added. The diameter of the particles is comprised in the range from 10 μm to 60 μm. The final formulation is shown in Table 5.

TABLE 5

| example of Zn based electrolyte | | | | |
|---|---|---|---|---|
| Chemical compound | Chemical formula | Molar mass [g/mol] | Concen-tration [g/L] | Concen-tration [mol/l] |
| Potassium hydroxide | KOH | 56.11 | 336.66 | 6.00 |
| Xanthan gum | $(C_{35}H_{49}O_{29})_x$ | 933.00 | 10.00 | 0.01 |
| Zinc oxide (particles) | ZnO | 81.38 | 20.00 | 0.25 |
| Zinc (particles) | Zn | 65.3 | 150.00 | 2.29 |

Example 6

Preparation of a Permanganate-Based Electrolyte for the RFB Half-Cell

The solution was prepared by dissolving NaOH in a concentration of 1M, in Millipore water at room temperature, followed by the addition of 1 M of $NaMnO_4$. The final formulation is shown in Table 6. The as-prepared solution can work from 25° C. to 70° C.

TABLE 6 example of Permanganate-Based Electrolyte

| Chemical compound | Chemical formula | Molar mass [g/mol] | Concentration [g/L] | Concentration [mol/l] |
|---|---|---|---|---|
| Sodium hydroxide | NaOH | 40.00 | 40.00 | 1.00 |
| Sodium permanganate | $NaMnO_4$ | 141.93 | 141.93 | 1.00 |

Example 7

Preparation of a Permanganate-Based Electrolyte for the RFB Half-Cell

One solution was prepared by dissolving KOH in a concentration of 2M, in Millipore water at room temperature, followed by the addition of 1 M of $KMnO_4$. The final formulation is shown in Table 7. The as-prepared solution can work from 25° C. to 70° C.

TABLE 7 example of Permanganate-Based Electrolyte

| Chemical compound | Chemical formula | Molar mass [g/mol] | Concentration [g/L] | Concentration [mol/l] |
|---|---|---|---|---|
| Potassium hydroxide | KOH | 56.11 | 112.22 | 2.00 |
| Potassium permanganate | $KMnO_4$ | 158.03 | 158.03 | 1.00 |

Example 8

Preparation of a Permanganate-Based Electrolyte With Dispersed Electrodes

A solution was prepared by dissolving NaOH and KOH with an overall concentration of 5 M in Millipore water at room temperature, followed by the addition of 0.5 M of $NaMnO_4$ and 0.5 M of $KMnO_4$. 3% by weight of carbon black particles with an average diameter between 100 and 200 μm has been added as flowable electrodes. The final formulation is shown in Table 8. The as-prepared solution can work from 25° C. to 70° C.

TABLE 8 example of Permanganate-Based Electrolyte

| Chemical compound | Chemical formula | Molar mass [g/mol] | Concentration [g/L] | Concentration [mol/l] |
|---|---|---|---|---|
| Sodium hydroxide | NaOH | 40.00 | 80.00 | 2.00 |
| Potassium hydroxide | KOH | 56.11 | 168.33 | 3.00 |
| Sodium permanganate | $NaMnO_4$ | 141.93 | 70.97 | 0.50 |

TABLE 8-continued example of Permanganate-Based Electrolyte

| Chemical compound | Chemical formula | Molar mass [g/mol] | Concentration [g/L] | Concentration [mol/l] |
|---|---|---|---|---|
| Potassium permanganate | $KMnO_4$ | 158.03 | 79.02 | 0.50 |
| Carbon Black | C | 12.01 | 13.56 | 1.13 |

Example 9

Figure 14:
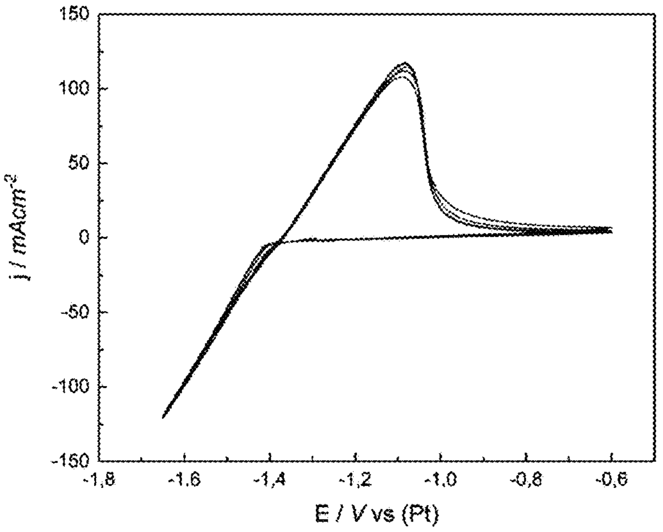
FIGS. 14 and 15 are graphs of cyclic voltammetry for two variants of Zn-based electrolyte of the invention.

Electrochemical Characterization of a Zinc-Based Electrolyte for the RFB Half-Cell The electrochemical behavior of solution prepared according to Example 1 has been characterized with cyclic voltammetry performed in a classical three electrodes cell using carbon felt as working electrode, MMO (mixed metal oxides) net as counter electrode and Pt as pseudo-reference electrode with Biologic VSP 300 Potentiostat/galvanostat at 25° C. The results are shown in FIG. 14.

Example 10

Figure 15:
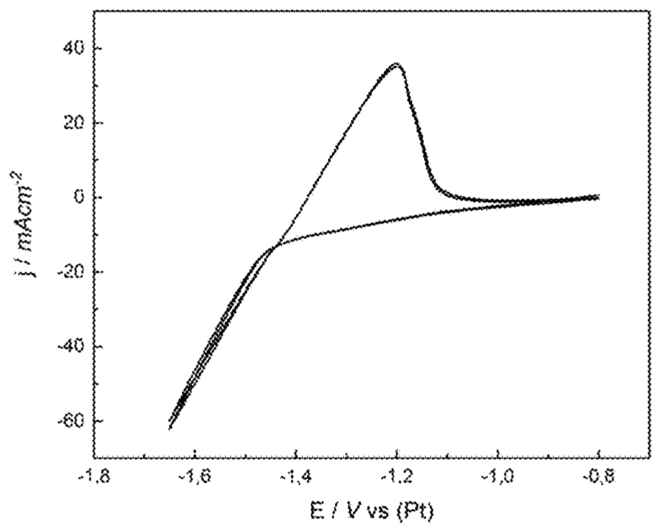

Electrochemical Characterization of a Zinc-Based Electrolyte for the RFB Half-Cell The electrochemical behavior of the solution prepared according to Example 2 has been characterized with cyclic voltammetry performed in a classical three electrodes cell using carbon felt as working electrode, MMO (mixed metal oxides) net as counter electrode and Pt as pseudo-reference electrode with Biologic VSP 300 Potentiostat/galvanostat at 25° C. The results are shown in FIG. 15.

Example 11

Figure 16:
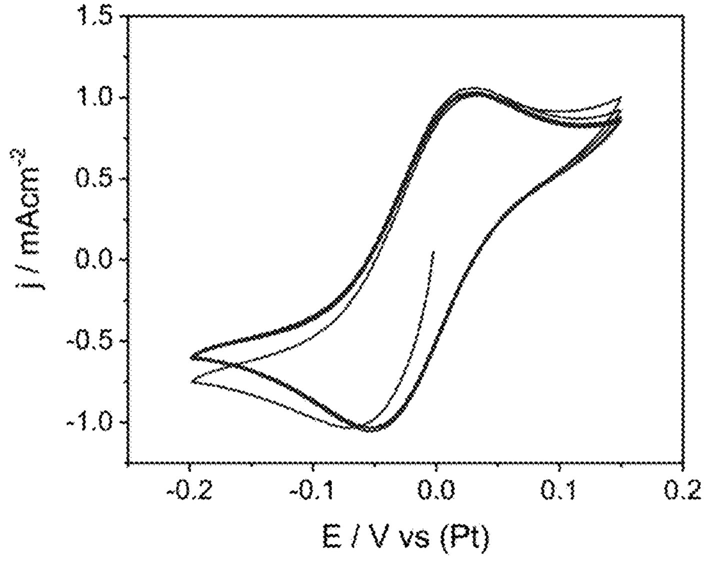
FIG. 16 is a graph of cyclic voltammetry for a permanganate-based electrolyte of the invention.

Electrochemical Characterization of a Permanganate-Based Electrolyte for RFB Half-Cell The electrochemical behavior of the solution prepared according to Example 6 was characterized with cyclic voltammetry performed in a classical three electrodes cell using glassy carbon as working electrode, platinum net (Pt) as counter electrode and Pt as pseudo-reference electrode with Biologic VSP 300 Potentiostat/galvanostat at 25° C. The results are shown in FIG. 16.

Cyclic voltammetries of zinc-based electrolyte (FIG. 14-15) and of permanganate-based electrolyte (FIG. 16) all indicate an excellent reversibility of the electrochemical reactions, characterized by a high faradic efficiency.

Example 12

Zn/Permanganate RFB With Optimized Electrolytes

Figure 2:
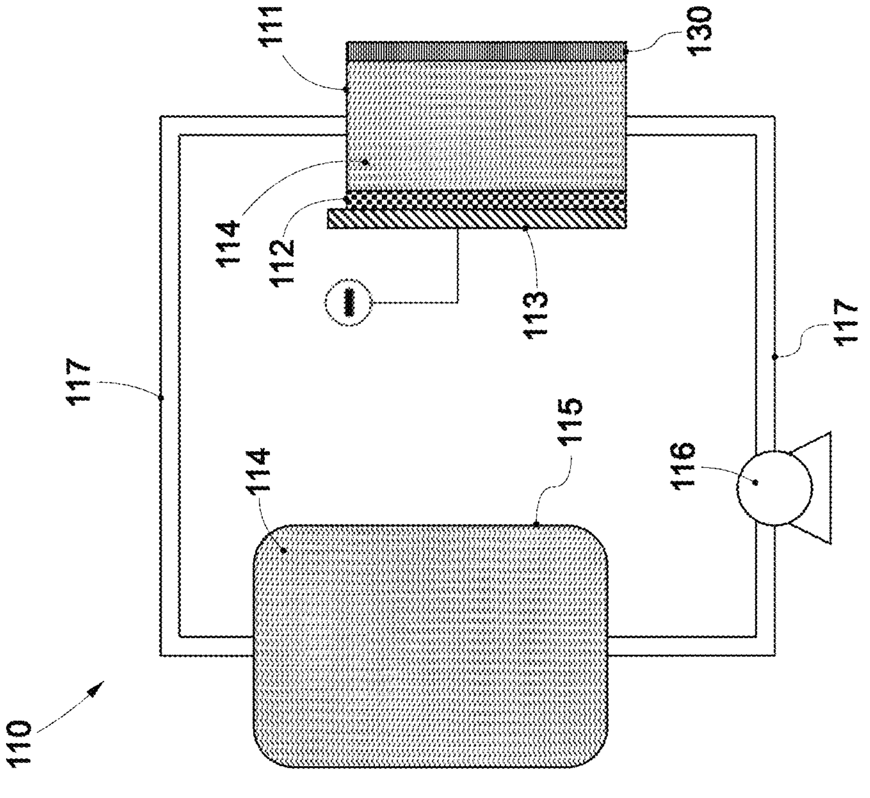
Figure 17:
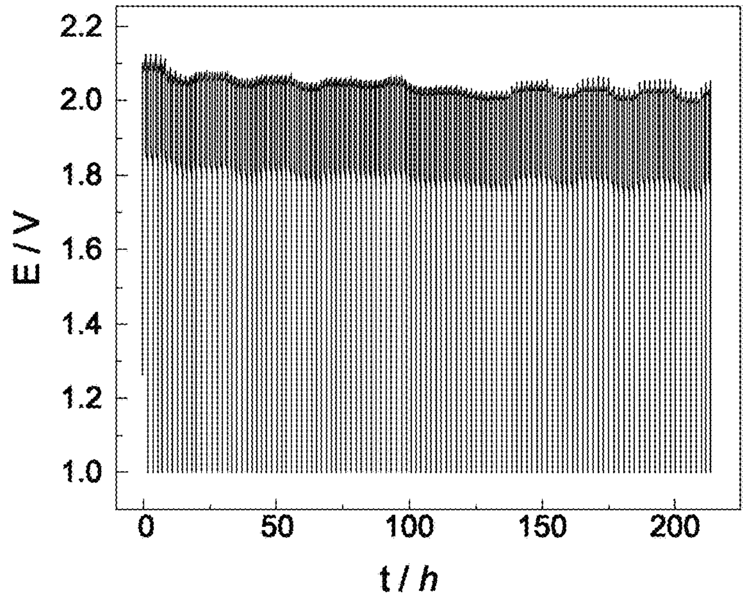
FIG. 17 is a graph representing charging and discharging cycles for a rechargeable flow battery according to the invention.
Figure 18:
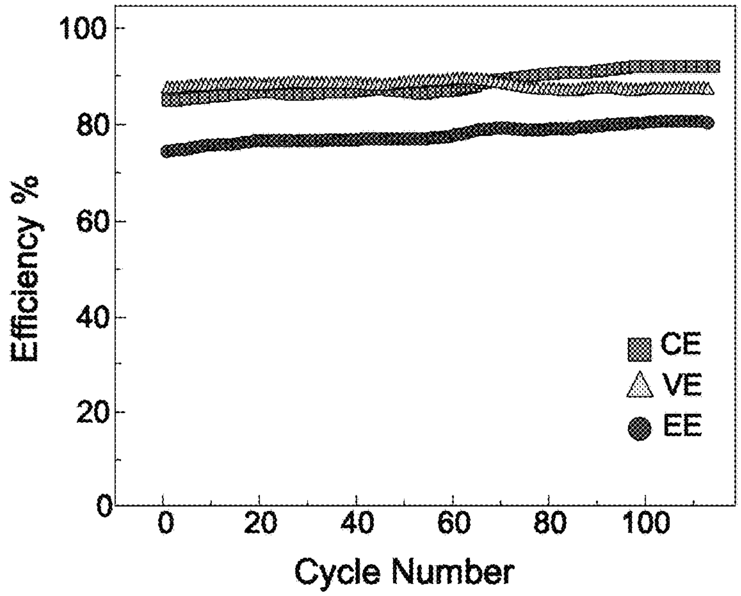
FIG. 18 is a graph representing the coulombic, voltaic and energetic efficiencies compared to the number of cycles for a rechargeable flow battery according to the invention.
Figure 19:
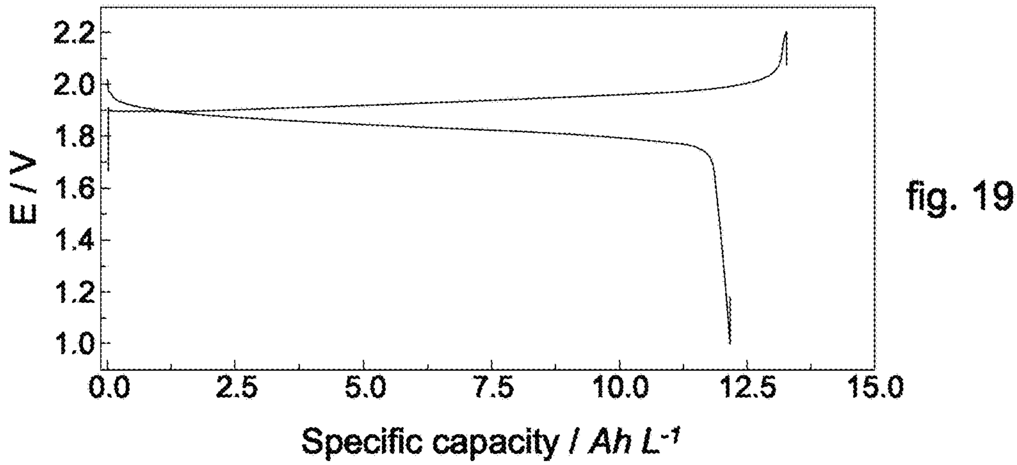
FIG. 19 is a graph representing the volumetric capacity of a rechargeable flow battery according to the invention.

The electrolytes prepared in examples 2 and 6 were used to obtain a zinc/permanganate RFB obtained by coupling a first half-cell according to FIG. 2 with a second half-cell according to FIG. 8, through a single-layer membrane 130. Electrochemical tests have been carried out in this RFB with a pumping system using a Biologic VMP-300 potentiostat/galvanostat, applying a current density of 10 $mAcm^{-2}$. The nominal area for the two electrodes was equal to 25 $cm^2$, resulting in a total applied current of 250 mA in the charge phase and −250 mA in the discharge phase. FIG. 17 shows the classical graph of charge and discharge cycles for this RFB. In FIG. 18 the device efficiencies relative cycles are also reported. The volumetric capacity for the battery using the same electrolyte is shown in FIG. 19.

The charge and discharge galvanostatic tests (FIG. 17-18) show not only a high cell potential for an aqueous system, but also a high cyclability in time. The proposed battery is capable of working at high energetic efficiency (>75%) for more than 200 hours.

The capacity test at a state of charge 100 (FIG. 19) shows the excellent stability of the electrochemical reactions during the complete charge and discharge of the battery.

It is clear that modifications and/or additions of parts may be made to the rechargeable flow battery as described heretofore, without departing from the field and scope of the present invention.

In the following claims, the references in brackets have the only scope of facilitating reading and shall not be considered as limitative factors as far as the scope of protection intended in the specific claims is concerned.

The invention claimed is:

1. A rechargeable flow battery, comprising a first half cell comprising a first work tank, a first electrode placed in the first work tank, a first a first external tank connected with said first work tank in a closed loop configuration, and a first pump configured to recirculate said first electrolyte between the first work tank and the first external tank; and a second half cell comprising a second work tank, a second electrode placed in the second work tank, a second electrolyte a second external tank connected to the second work tank in a closed loop configuration, and a second pump configured to recirculate the second electrolyte between the second work tank and the second external tank;

wherein the first electrolyte is an alkaline solution comprising at least one compound source of $Zn(OH)_4^{2-}$ ions, which are suitable to be electrochemically reduced to the metallic state during the charging process, and the second electrolyte is an alkaline solution comprising at least one compound source of $MnO_4^{2-}$ ions, which are suitable to be electrochemically oxidized to $MnO_4^-$during the charging process, wherein oxidation of the $MnO_4^{2-}$ ions to $MnO_4^-$ during the charging process occurs without electrodeposition of Mn or $MnO_2$ at the second electrode.

2. The rechargeable flow battery of claim 1, wherein the compound source of $Zn(OH)_4^{2-}$ comprises a zinc based salt chosen among zinc oxide, zinc hydroxide, zinc acetate, zinc chloride, zinc carbonate or a combination of two or more thereof, or electroactive particles containing zinc ions in different oxidation states.

3. The rechargeable flow battery of claim 1, wherein the compound source of $MnO_4^-$comprises a permanganate based salt chosen among lithium permanganate, sodium permanganate, potassium permanganate or a combination of two or more thereof, or electroactive particles containing permanganate ions in different oxidation states.

4. The rechargeable flow battery of claim 1, wherein the first electrolyte and/or the second electrolyte further comprises conductive particles.

5. The rechargeable flow battery of claim 4, wherein the first electrode and/or the second electrode is a static electrode, the conductive particles being additives to the first electrolyte and/or the second electrolyte comprising the conductive particles.

6. The rechargeable flow battery of claim 5 wherein the conductive particles in the first electrolyte comprise zinc-based conductive particles and/or carbon-based conductive particles chosen among zinc particles, zinc oxide particles, zinc coated particles, graphene, expanded graphite, reduced graphene oxide, active carbon, carbon black, acetylene black, carbon nanotubes or a combination of two or more thereof.

7. The rechargeable flow battery of claim 4, wherein the first electrode and/or the second electrode is a flowable electrode, the flowable electrode comprising the conductive particles contained in the first electrolyte and/or the second electrolyte comprising the conductive particles.

8. The rechargeable flow battery of claim 7 wherein the conductive particles in the first electrolyte comprise zinc-based conductive particles and/or carbon-based conductive particles chosen among zinc particles, zinc oxide particles, zinc coated particles, graphene, expanded graphite, reduced graphene oxide, active carbon, carbon black, acetylene black, carbon nanotubes or a combination of two or more thereof.

9. The rechargeable flow battery of claim 4, wherein the conductive particles in the first electrolyte comprise zinc-based conductive particles and/or carbon-based conductive particles chosen among zinc particles, zinc oxide particles, zinc coated particles, graphene, expanded graphite, reduced graphene oxide, active carbon, carbon black, acetylene black, carbon nanotubes or a combination of two or more thereof.

10. The rechargeable flow battery of claim 4, wherein the conductive particles in the second electrolyte comprise carbon-based conductive particles chosen among graphene, expanded graphite, reduced graphene oxide, active carbon, carbon blacks, acetylene black, carbon nanotubes or a combination of two or more thereof.

11. The rechargeable flow battery of claim 1, wherein the compound source of $Zn(OH)_4^{2-}$ comprises a zinc based salt chosen among zinc oxide, zinc hydroxide, zinc acetate, zinc chloride, zinc carbonate or a combination of two or more thereof, and in that the first electrolyte further comprises electroactive particles containing zinc ions in different oxidation states.

12. The rechargeable flow battery of claim 1, wherein the compound source of $MnO_4^{2-}$comprises a permanganate based salt chosen among lithium permanganate, sodium permanganate, potassium permanganate or a combination of two or more thereof, and in that the second electrolyte further comprises electroactive particles containing permanganate ions in different oxidation states.

13. The rechargeable flow battery of claim 1, wherein the first electrolyte further comprises one or more of:

a salt, oxide or hydroxide of one or more metals capable of shifting the zinc electrochemical potential and increasing the overvoltage of hydrogen evolution, selected among Pb, Mn, Sn, Fe, Ni, Cu, Mg, Ti, Co, Al, Li, Zr;

a hydrogen evolution suppressor selected among silicates, boric acid, the metals Pb, Bi, Mn, W, Cd, As, Sb, Sn and In, the oxides of said metals, or a combination of two or more thereof;

Rochelle salts;

a leveling agent selected among polyethylene glycol, polyethylenimine, thiourea, quaternary ammonium salts, dextrins, cyclodextrins, sucrose, polytetrafluoroethylene, sodium dodecyl sulfate, polyacrylic acid, glucose, cellulose or a combination of two or more thereof;

a plasticizer additive selected among polyols, ethylene glycol, diethylene glycol, tetraethylene glycol, propylene glycol, glycerol, mannitol, sorbitol, xylitol, monosaccharides, fatty acids, urea, ethanolamine, triethanolamine, vegetable oils, lecithin, waxes, amino acids, surfactants and oleic acid;

a thickener additive; and an organic additive selected among xanthan gum, gum arabic, carboxymethyl cellulose, chitosan, agar-agar, sodium alginate and polyethylene oxide.

14. The rechargeable flow battery of claim 1, wherein the second electrolyte further comprises one or more of:

a salt, oxide or hydroxide of one or more metals capable of shifting the permanganates redox potential, increasing the catholyte conductivity and acting as balancing ions through an ion-selective membrane, selected among Pb, Sn, Fe, Ni, Cu, Mg, Zn, Ti, Rb, Cs, Ca, K, Sr, Co, Al, Li, Zr or a combination of two or more thereof;

a plasticizer additive selected among polyols, ethylene glycol, diethylene glycol, tetraethylene glycol, propylene glycol, glycerol, mannitol, sorbitol, xylitol, monosaccharides, fatty acids, urea, ethanolamine, triethanolamine, vegetable oils, lecithin, waxes, amino acids, surfactants and oleic acid;

a thickener additive; and an organic additive selected among xanthan gum, gum arabic, carboxymethyl cellulose, chitosan, agar-agar, sodium alginate and polyethylene oxide.

15. The rechargeable flow battery of claim 1, further comprising a separator between the first half cell and the second half cell, and wherein the separator is chosen between:

a separator of uniform composition selected among a porous separator without active ion-exchange material, an ion-selective porous membrane, a solid state ceramic separators or a glass-ceramic separator, or a membrane made of a co-polymer of perfluorosulfonic acid and polytetrafluoroethylene; and a multilayer separator comprising at least a first homogeneous layer coupled to a second layer, said second layer being made of one among poly-vinyl alcohol (PVA), chitosan, poly-acrylic acid (PAA), gelatin and co-polymer of perfluorosulfonic acid and polytetrafluoroethylene, said second layer containing ionic particles and/or carbon-based conductive particles.

* * * * *